US009473239B2

(12) United States Patent
Butler et al.

(10) Patent No.: US 9,473,239 B2
(45) Date of Patent: Oct. 18, 2016

(54) SYSTEMS AND METHODS FOR ALIGNING AN OPTICAL INTERFACE ASSEMBLY WITH AN INTEGRATED CIRCUIT

(71) Applicant: Corning Cable Systems LLC, Hickory, NC (US)

(72) Inventors: Douglas Llewellyn Butler, Painted Post, NY (US); Ying Geng, Painted Post, NY (US); Micah Colen Isenhour, Lincolnton, NC (US); Christopher Paul Lewallen, Hudson, NC (US); James Phillip Luther, Hickory, NC (US); Andreas Matiss, Berlin (DE)

(73) Assignee: CORNING CABLE SYSTEMS LLC, Hickory, NC (US)

( * ) Notice: Subject to any disclaimer, the term of this patent is extended or adjusted under 35 U.S.C. 154(b) by 22 days.

(21) Appl. No.: 14/090,478

(22) Filed: Nov. 26, 2013

(65) Prior Publication Data

US 2015/0055948 A1     Feb. 26, 2015

Related U.S. Application Data

(60) Provisional application No. 61/868,826, filed on Aug. 22, 2013.

(51) Int. Cl.
*G02B 6/42*     (2006.01)
*H04B 10/071*     (2013.01)
*G02B 6/38*     (2006.01)

(52) U.S. Cl.
CPC .......... *H04B 10/071* (2013.01); *G02B 6/4225* (2013.01); *G02B 6/3898* (2013.01); *G02B 6/4214* (2013.01)

(58) Field of Classification Search
CPC .......... G02B 6/122; G02B 6/12; G02B 6/30; G02B 6/4284; G02B 6/4214; G02B 6/43; G02B 6/4292; G02B 6/4225; G02B 6/3898; H04B 16/071

USPC ...................................................... 385/14, 88
See application file for complete search history.

(56) References Cited

U.S. PATENT DOCUMENTS

| | | | | |
|---|---|---|---|---|
| 4,545,643 | A * | 10/1985 | Young ...................... | G02B 6/32 385/78 |
| 5,333,225 | A * | 7/1994 | Jacobowitz .......... | G02B 6/4292 333/254 |
| 6,587,618 | B2 | 7/2003 | Raguin et al. ................... | 385/33 |
| 9,102,563 | B2 * | 8/2015 | Laughlin ................... | C03C 8/02 |
| 2001/0021287 | A1 * | 9/2001 | Jewell .................. | G02B 6/4206 385/14 |
| 2002/0131699 | A1 * | 9/2002 | Raguin .................. | G02B 6/322 385/33 |
| 2005/0063634 | A1 * | 3/2005 | Cohen ................ | B29D 11/0075 385/14 |

(Continued)

*Primary Examiner* — Thomas A Hollweg
*Assistant Examiner* — Mary A El Shammaa

(57) ABSTRACT

Systems and methods of aligning an optical interface assembly with an integrated circuit (IC) are disclosed. The method includes emitting light from an optical transmitter, passing the emitted light through the optical interface assembly in a first direction, and reflecting the emitted light from a reflective surface disposed immediately adjacent a front end of the optical interface assembly to define reflected light that travels back through the optical interface assembly in a second direction that is substantially opposite the first direction. The reflected light is received by an optical receiver that generates in response a receiver signal. The relative position of the optical interface assembly and the IC is adjusted to achieve an aligned position based on the receiver signal. The disclosure is also directed to a test plug for aligning an optical interface assembly to the IC.

20 Claims, 12 Drawing Sheets

(56) References Cited

U.S. PATENT DOCUMENTS

| | | | |
|---|---|---|---|
| 2005/0100264 A1* | 5/2005 | Kim | G02B 6/42 385/14 |
| 2005/0248822 A1* | 11/2005 | Tohgoh | G02B 6/421 359/31 |
| 2008/0044141 A1* | 2/2008 | Willis | G02B 6/3887 385/88 |
| 2009/0285535 A1* | 11/2009 | van Geffen | G02B 6/32 385/88 |
| 2010/0006784 A1* | 1/2010 | Mack | G02B 6/34 250/551 |
| 2011/0243511 A1* | 10/2011 | Tong | G02B 6/3817 385/88 |
| 2012/0243823 A1* | 9/2012 | Giboney | H01P 1/162 385/14 |
| 2013/0094799 A1 | 4/2013 | Mathai et al. | 385/14 |

* cited by examiner

SYSTEMS AND METHODS FOR ALIGNING AN OPTICAL INTERFACE ASSEMBLY WITH AN INTEGRATED CIRCUIT

CROSS-REFERENCE TO RELATED APPLICATIONS

This application claims the benefit of priority under 35 USC §119 of U.S. Provisional Application Ser. No. 61/868,826, filed on Aug. 22, 2013, the content of which is relied upon and incorporated herein by reference in its entirety.

FIELD

The disclosure relates generally to optical interface assemblies and structures useful for optical communication with integrated circuits, and in particular to systems and methods for aligning an optical interface assembly with an integrated circuit, such as in silicon-based photonics applications, to establish acceptable performance for efficient optical communication between the integrated circuit and an optical plug assembly.

BACKGROUND

Optical fibers have displaced copper-based connectivity in much of the traditional long-haul and metro telecommunication networks for numerous reasons such as large bandwidth capacity, dielectric characteristics and the like. Higher network speeds will drive optical fiber deeper into the communication networks, toward the electronics located in servers and switches that manage traffic on the communication network. This migration will result in new challenges for making optical connections to electronics for high-speed communications. These challenges include aligning and maintaining optical alignment for a high-density optical connection with integrated circuits.

SUMMARY

An aspect of the disclosure is a method of aligning an optical interface assembly with an integrated circuit that includes at least one optical transmitter and at least one optical receiver. The method includes emitting light from the at least one optical transmitter; passing the emitted light through the optical interface assembly in a first direction; reflecting the emitted light from a reflective surface disposed immediately adjacent a front end of the optical interface assembly to define reflected light that travels back through the optical interface assembly in a second direction that is substantially opposite the first direction; receiving the reflected light with the at least one optical receiver and generating in response at least one receiver signal; and adjusting a relative position between the optical interface assembly and the integrated circuit to achieve an aligned position based on the at least one receiver signal.

Another aspect of the disclosure is an alignment system for aligning an optical interface assembly with an integrated circuit that includes at least one optical transmitter and at least one optical receiver. The system includes the optical interface assembly, wherein the optical interface assembly has first and second ends and an optical path therebetween and wherein the second end resides immediately adjacent the at least one optical transmitter and the at least one optical receiver. The system also includes a reflective alignment fixture having a reflective surface and that is interfaced with the first end of the optical interface assembly so that the reflective surface confronts the first end. The emitted light from the at least one optical transmitter travels over the optical path to the reflective surface to form reflected light that travels over the optical path from the reflective surface to the at least one receiver, which in response generates at least one receiver signal representative of an amount of reflected light received and thus representative of a degree of alignment between the optical interface assembly and the integrated circuit.

Another aspect of the disclosure is a test plug for performing optical alignment of an optical interface assembly having an optical path with an integrated circuit that includes at least one optical transmitter and at least one optical receiver. The test plug includes a reflective alignment fixture that includes a front end, a back end and opposite sides, wherein the front end includes a reflective surface. The test plug also includes an attachment body that holds the reflective alignment fixture. The test plug further includes at least one alignment feature configured to engage a complimentary alignment feature of the optical interface assembly such that the reflective surface confronts a front end of the optical interface assembly at an end of the optical path.

Additional features and advantages will be set forth in the Detailed Description that follows, and in part will be readily apparent to those skilled in the art from the description or recognized by practicing the embodiments as described in the written description and claims hereof, as well as the appended drawings.

It is to be understood that both the foregoing general description and the following Detailed Description are merely exemplary and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Figure 1:
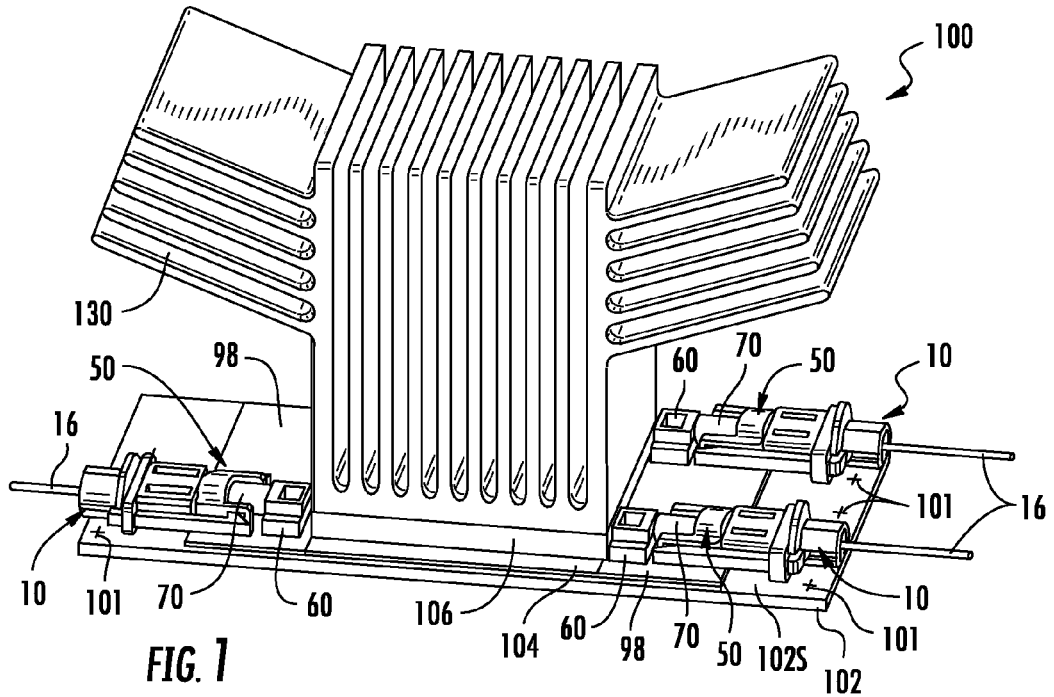
FIG. 1 is a perspective view of an optical interface structure having an optical interface for optical connection with one or more optical plug assemblies according to the concepts disclosed herein.

Reference is now made in detail to the embodiments of the disclosure, examples of which are illustrated in the accompanying drawings. Whenever possible, identical or similar reference numerals are used throughout the drawings to refer to identical or similar parts. It should be understood that the embodiments disclosed herein are merely examples, each embodiment incorporating certain benefits of the present disclosure. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure in view of, but not limited to, the embodiments described herein.

Disclosed is a test plug for aligning an optical interface assembly with an integrated circuit to establish acceptable performance for efficient optical communication between the integrated circuit and an optical plug assembly that matingly engages with the optical interface assembly. Details of optical interface structures and integrated circuits are also disclosed.

As used herein, an "integrated circuit" (IC) means an optical/electrical integrated circuit (IC) having an optical interface for communicating optical signals. The optical interface can include one or more optical transmitters and one or more optical receivers. The term "optical interface structure" means a structure including an IC.

The term optical interface assembly as used herein may be a portion of one or more ICs having an electrical and/or optical communication interface. By way of example, the optical interface assembly may be a portion of a self-contained IC, or in another embodiment, the optical interface assembly may act as a signal bridge between the IC connected electrically to a circuit board or the like while also being able to process high-speed optical signals received from the optical interface structure via the optical connection.

Specifically, the optical interface assembly and the related optical assembly cooperate to provide high-speed optical communication links to an electronic device. Embodiments may have a matched thermal response between materials for maintaining a proper optical alignment between optical paths on the optical interface assembly and the integrated circuit.

Although embodiments may discuss the optical interface assembly as a discrete component from the IC, the concepts of the optical interface assembly may be integrated as a portion of an IC according to the concepts disclosed. Further, although discussed in the context of an optical interface assembly, the concepts of the optical interface assembly may be used for other applications as appropriate.

Optical Interface Structure

Figure 2:
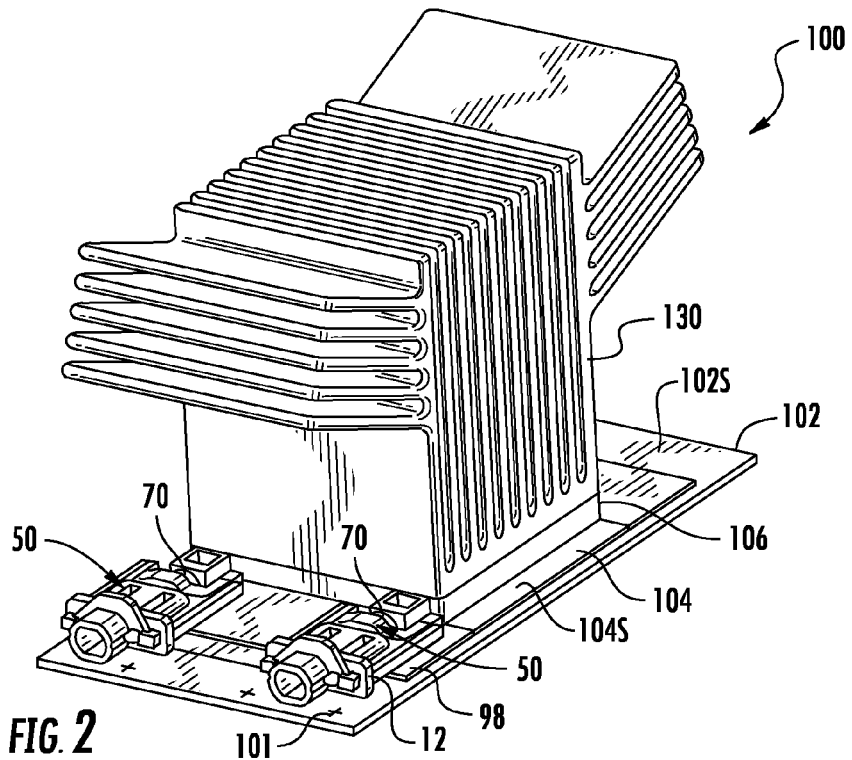
FIG. 2 is another perspective view of the optical interface structure of FIG. 1 where the optical fibers are removed from the optical plug assemblies.

FIGS. 1 and 2 are perspective views of an optical interface structure 100 having an optical interface assembly 50 for communicating optical signals to/from an integrated circuit, such as an IC 104. In other words, optical interface structure 100 provides an integrated silicon photonics solution using optical interface assembly 50 for providing optical communication to an IC, such as IC 104 or the like, thereby allowing an optical data connection instead of solely having a conventional copper data connection via an electrical connector.

Also shown is an optical plug assembly 10 attached to optical interface assembly 50 for communicating optical signals to and from optical interface structure 100 from another device (not shown). In this embodiment, IC 104 includes a circuit for the conversion of optical and electrical signals and is in communication with another IC such as an electro-optical circuit 106 as in electrical communication. However, other embodiments according to the concepts disclosed may not use electro-optical circuit 106 but instead have all of the desired functionality included in one IC such as IC 104. The IC 104 has an upper surface 104S.

As shown, optical interface structure 100 includes a circuit board 102 having an upper surface 102S, IC 104, and electro-optical circuit 106 along with optical interface assembly 50. The IC 104 and/or electro-optical circuit 106 may be electrically attached to circuit board 102 and may include communication links therebetween such as electrical connections for signal transfer, power and the like. In an example, IC 104 includes silicon-based photonic devices 105 such as optical transmitters (emitters) 105T and optical receivers (e.g., photodetectors) 105R (see FIG. 15 and FIG. 22A).

The optical interface structure 100 shown may also optionally include a heat sink 130 such as is disposed on electro-optical circuit 106 for cooling and for providing a lower operating temperature for the ICs of the structure, but other cooling arrangements are possible such as other types of heat sinks, cooling fans, etc. FIG. 2 is a perspective view of optical interface structure 100 shown from another angle where optical fibers 16 are removed from a proximal plug ("plug") 12 of optical plug assembly 10.

Figure 3:
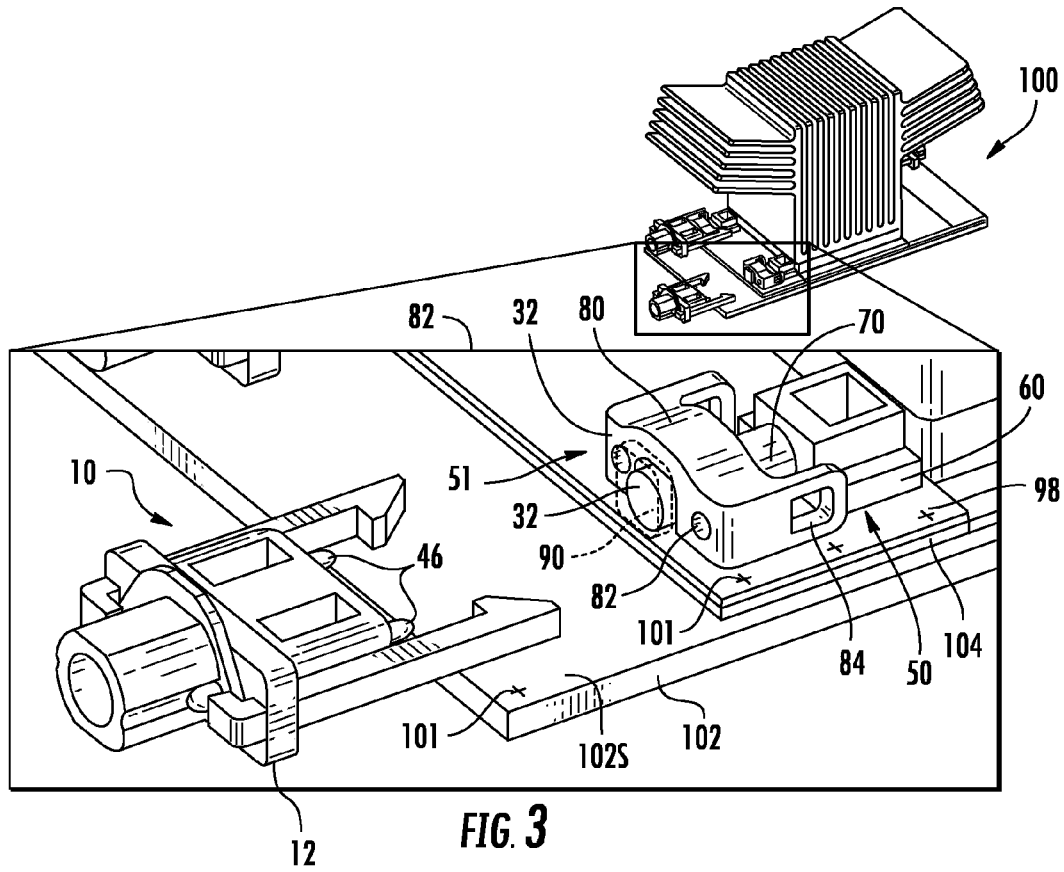
FIG. 3 is a detailed perspective view of an unmated optical connection between the optical interface assembly of the optical interface structure and the optical plug assembly.
Figure 4:
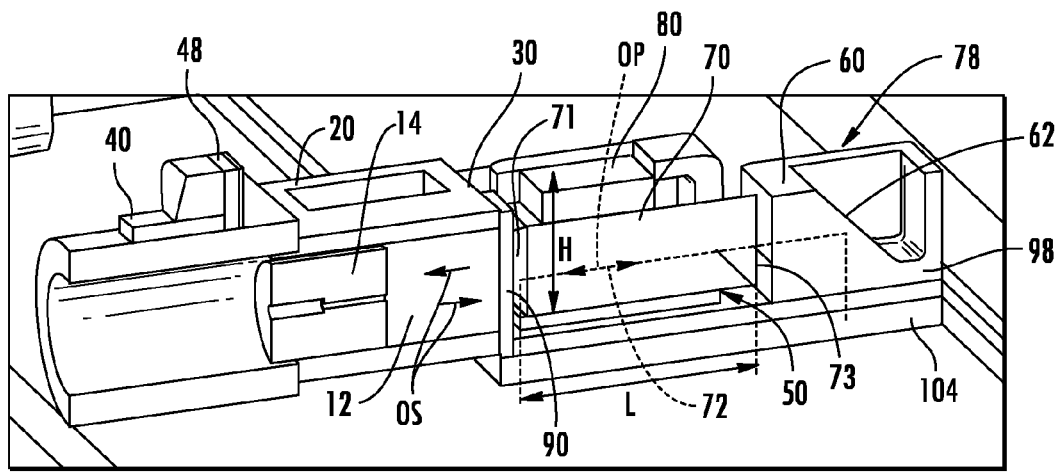
FIG. 4 is a cross-sectional view showing the optical connection between the optical interface assembly of the optical interface structure and the optical plug assembly.

FIG. 3 is a detailed perspective view showing an unmated optical connection between optical interface assembly 50 of optical interface structure 100 and plug 12 of optical plug assembly 10. FIG. 4 is a mated cross-sectional view of the optical connection. As depicted, optical interface assembly 50 includes an optical turning element 60 and a gradient-index (GRIN) lens 70. The optical interface assembly 50 also includes a front end 51, a back end 53 (see FIG. 22A) and a connector attachment saddle 80. The connector attachment saddle 80 includes an optical alignment structure 82 for precisely aligning optical plug assembly 10 with an optical pathway OP of optical interface assembly 50 for communication with an integrated circuit, such as IC 104 or another circuit. Optical pathway OP includes GRIN lens 70 and optical turning element 60. In an example, In this embodiment, GRIN lens 70 includes a front end 71, a centerline 72, a back end 73 and an axial length L. Also, in an example, optical alignment structure 82 includes one or more bores disposed on opposite sides of connector attachment saddle 80 for receiving alignment pins 46 of plug 12 for providing optical alignment between optical interface assembly 50 and the plug. The connector attachment saddle 80 also includes one or more attachment features 84 for securing plug 12 thereto, as discussed below.

The optical interface assembly 50 may also include an optional window 90 (e.g., a non-GRIN material) interfaced with front end 71 of GRIN lens 70 at front end 51 of the optical interface assembly. In such an example, window 90, GRIN lens 70 and optical turning element 60 define an example lens assembly 78. The window 90 is made of a material that allows transmission of optical signals at transmitting wavelengths, such as in the range from 850 nm to 1300 nanometers, but other wavelengths are possible. The window 90 aids the assembly of optical interface assembly 50 by providing a mounting reference surface for connector attachment saddle 80. The window 90 has a suitable thickness and forms a portion of optical pathway OP of optical interface assembly 50. The window 90 provides an interface between GRIN lens 70 of optical interface assembly 50 and the GRIN lens of plug 12 or a test plug 312, which is introduced and discussed below.

As noted above, optical pathway OP of optical interface assembly 50 also includes the length L of GRIN lens 70 and the length through optical turning element 60 (e.g., a non-GRIN material). The GRIN lens 70 may have any suitable length L. In one embodiment, GRIN lens 70 has a length L that is shorter than one quarter pitch of the wavelength being communicated to optical interface assembly 50. The optical interface assembly 50 has a height H that provides a low profile. By way of example, the height H may be 10 millimeters or less in one embodiment, 6 millimeters or less in another embodiment and even 3 millimeters or less in yet another embodiment.

The IC 104 may include circuitry for converting signals, such as optical signals, to electrical signals (i.e., o-e conversion) and/or electrical signals to optical signals (i.e., e-o conversion), depending on the construction of the given optical interface structure 100. By way of example, the optical signals from optical interface assembly 50 may be received by one or more optical receivers (photodiodes) or the like that are part of IC 104 for o-e conversion and then further processed as electrical receiver signals. Likewise, IC 104 can transmit optical signals to optical interface assembly 50 after e-o conversion of the electrical signals from IC 104 or other circuit, e.g., via one or more optical transmitters.

The IC 104 may also include other suitable circuits for signal processing of the high-speed signals as desired. However, optical interface assembly 50 may be directly attached to any suitable IC or structure or have other applications. By way of example, the present embodiment has optical interface assembly 50 attached to an optional base 98. The base 98 may be used for aiding the assembly of optical interface assembly 50 and for aligning the optical channels of the optical interface assembly with IC 104, as discussed below. The base 98 is formed from a material that allows the transmission of optical signals therethrough toward IC 104. The base 98 may also include alignment fiducials or another physical structure for aiding the alignment between the base and optical turning element 60 or the base and IC 104. In an example, base 98 is considered part of optical interface assembly 50.

In an example, at least one of base 98, circuit board upper surface 102S and upper surface 104S of IC 104 includes one or more alignment features 101 that facilitate aligning various components of optical interface assembly 50 on IC 104 during assembly, as described below. Alignment features 101 can also serve to establish coarse alignment of plug 12 or test plug 312 (introduced and discussed below) with optical interface assembly 50 when mating either of these to plugs to the optical interface assembly. An exemplary alignment feature 101 is a fiducial mark that can be imaged and processed by a machine vision system (not show) used in the assembly or alignment/mating process.

Figure 13:
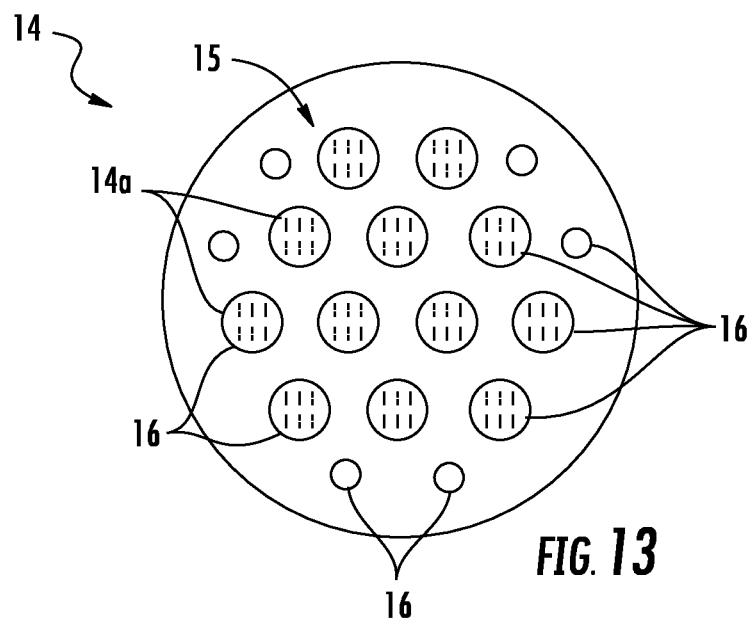
FIG. 13 depicts an end view of a representative optical-fiber organizer having an optical-fiber array that is similar to the optical-fiber organizer of the optical plug assembly depicted in FIG. 8.
Figure 14:
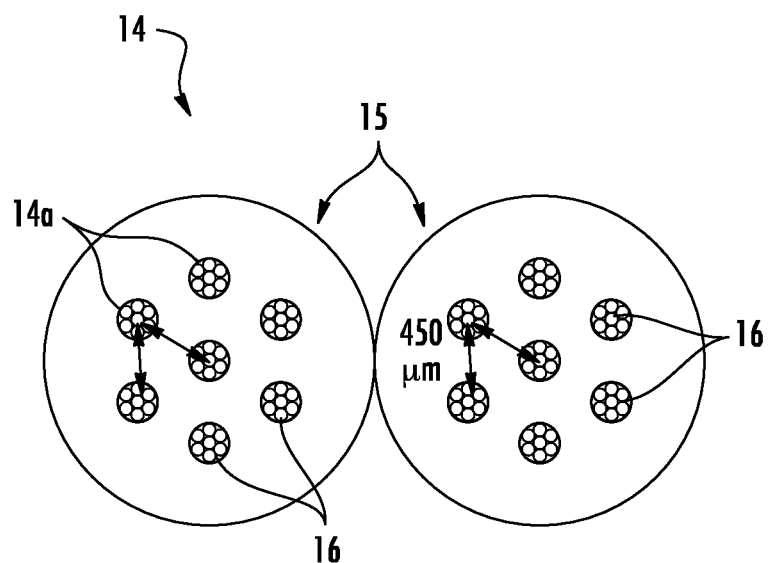
FIG. 14 depicts an end view of representative optical-fiber arrays that may be used with other plugs having multiple optical-fiber organizers for receiving multiple optical fibers.

Additionally, base 98 may have more than one optical interface assembly 50 attached to the same, as is shown in FIGS. 1-3. Although FIGS. 1-3 depict two optical interface assemblies 50 on one base 98, the base may include one or more of the optical interface assemblies as desired for increasing the bandwidth capabilities. Other methods for increasing the bandwidth capabilities are also possible. For instance, optical turning element 60 may have a larger width for attaching a plurality of GRIN lenses 70 to a single optical turning element, instead of having separate optical turning elements for each GRIN lens. FIGS. 13 and 14, introduced and discussed below, show other possible arrangements for multiple GRIN lens 70 arrays, and likewise optical plug assembly 10 would have a complimentary arrangement. Suitable connector attachment saddles 80 may be used with these concepts as appropriate.

With reference to FIG. 4, plug 12 transmits and receives optical signals OS from optical interface assembly 50 over optical path OP. The plug 12 includes an optical-fiber organizer 14 having a plurality of bores 14a (FIG. 11) that are arranged in a precise array that may be symmetrical or asymmetrical as desired. The plug 12 is discussed in more detail below with respect to FIGS. 8-14.

The optical path OP supports one or more optical channels that each carry respective optical signals OS. As an example, one of the optical channels defined by optical interface assembly 50 is discussed with respect to optical signals OS received from plug 12. With continuing reference to FIG. 4, optical signal OS received from plug 12 first encounters window 90, which has an axial thickness such that the window does not materially impact the transmission of the optical signal. However, the thickness of window 90 does alter the total length of optical path OP for the optical coupling.

Next, optical signal OS passes into GRIN lens 70, whose front end 71 is in close proximity to window 90. The optical signal OS then travels through GRIN lens 70, exits back end 73 and enters optical turning element 60. The GRIN lens 70 has a suitable index profile and a suitable length L to substantially collimate optical signal OS. The optical turning element 60 is formed from a suitable material, such as LEXAN or the like, that is transparent to the wavelength(s) of optical signal OS being transmitted. The optical turning element 60 is used for turning optical signal OS downward toward IC 104. By way of example, optical turning element 60 may have a total internal reflection (TIR) surface 62 that is formed by the material/air interface of the optical turning element as known. However, other suitable structures, such as reflective optics, are possible for turning optical signals toward IC 104.

Optical Interface Assembly

Figure 5:
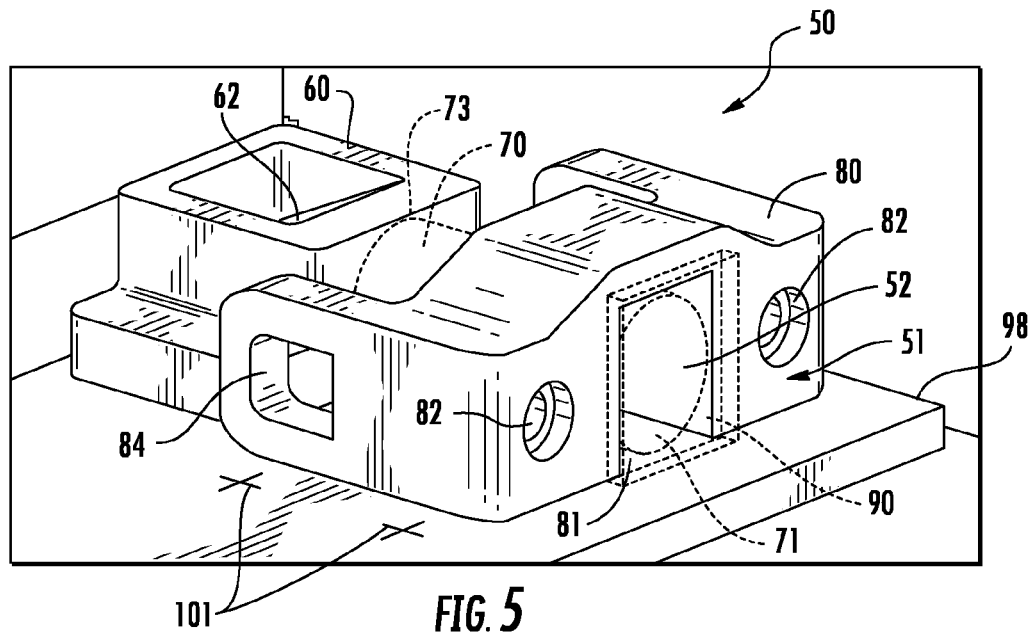
FIG. 5 is a perspective view of the optical interface assembly of the optical interface structure shown in FIGS. 1 and 2.
Figure 6:
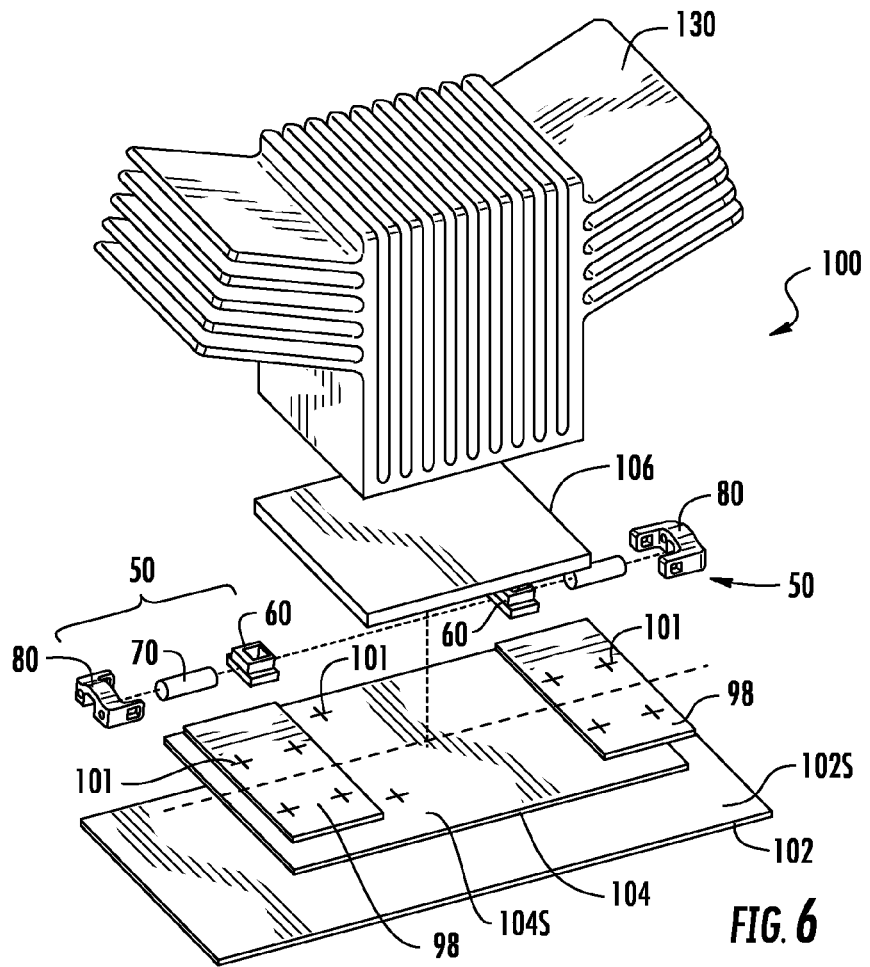
FIG. 6 is an exploded view of the optical interface structure of FIGS. 1 and 2.

FIG. 5 is a perspective view of optical interface assembly 50 of optical interface structure 100, and FIG. 6 is an exploded view of the optical interface structure. The optical interface assembly 50 includes an optical interface 52 with an optical alignment structure 82 for positioning optical plug assembly 10 during mating with the optical interface assembly. As depicted, GRIN lens 70 is attached to optical turning element 60 for communicating optical signals OS through optical interface assembly 50. The connector attachment saddle 80 fits about a portion of GRIN lens 70. How optical interface assembly 50 is constructed is discussed in more detail in relation to FIG. 7. A suitable complimentary assembly may be attached to optical interface assembly 50 for forming an optical interconnection, and the complimentary assembly, such as a plug, may also include a GRIN lens.

Using an optical interconnection that allows for mating and demating of the optical connection is desirable for manufacturing, assembly, disassembly, moves, adds or changes. Moreover, separating the delicate integrated circuits with the precision-mounted optics thereon from the forces associated with the complimentary optical plug assembly 10 is beneficial. For instance, an example optical plug assembly 10 includes flexible waveguides, such as optical fibers, that can move and transition if external forces are applied, thereby inhibiting the transfer of forces to the integrated circuits. Further, a portion of optical plug assembly 10 may be anchored or strain-relieved to a rigid portion of optical interface structure 100 to further isolate forces from the integrated circuits having optical interface assembly 50. Consequently, any external forces are substantially inhibited from being transmitted to the integrated circuits having optical interface assembly 50.

The optical connection between optical interface assembly 50 and optical plug assembly 10 can provide a relatively large number of optical connections (channels) in a relatively small area, i.e., multiple optical channels passing through a single GRIN lens 70. This serves to provide a large-bandwidth optical connection without any of the concerns generally associated with electrical connections, such as cross-talk, stray capacitance, etc. Further, the number and density of optical channels in the optical connection, and thus the bandwidth, may be increased by using optical fibers 16 with multi-core constructions instead of single-core optical fibers; however, the optical channels need sufficient spacing to inhibit optical cross-talk.

In the simplest forms, plug 12 of the optical connection has a single optical fiber 16 attached that may be a single-core or multi-core optical fiber; however, bandwidth may be greatly increased by attaching more than one optical fiber to the plug, or by using an optical fiber having multiple cores. In other words, using plug 12 with a single multi-core optical fiber 16 having eight cores may increase the bandwidth by a factor of eight as compared with an optical fiber having one core.

By way of further example, several multi-core optical fibers 16, each having eight (8) cores for transmitting up to eight optical signals over each optical fiber, can dramatically increase the bandwidth, but optical fibers may have any other suitable number of cores. Further discussion on the arrangement of the optical channels is provided below with reference to FIG. 15, which depicts a simplified schematic representation of two optical paths OP1 and OP2 formed by the optical connection between optical interface assembly 50 and optical plug assembly 10 similar to that shown in FIG. 4.

Providing the precise alignment between the optical pathways of IC 104 and optical fibers 16 of optical plug assembly 10 presents alignment challenges. These alignment challenges increase when multi-core optical fibers 16 are used since issues such as rotational alignment also must be addressed to align the multiple cores in a single optical fiber. Further, the precise optical alignment needs to be maintained even with large temperature variations and may include challenges associated with manufacturing if optical interface assembly 50 is exposed to processes such as solder reflow. Consequently, the coefficient of thermal expansion (CTE) between the one or more materials of optical interface assembly 50 and the primary material of IC 104 needs to be matched to a given value (i.e., CTE difference between materials) for accommodating variations in temperature so that suitable optical connectivity is maintained. In one embodiment, IC 104 is formed or may include a silicon material such as from a silicon wafer, with the optical pathways formed on the silicon during a manufacturing process. In other words, different layers of IC 104 are formed onto the silicon during the manufacturing process. Moreover, the CTE of each of the one or more materials of optical interface assembly 50 should be within a given range (e.g., CTE difference) of the CTE of IC 104 for maintaining optical performance during temperature variations and/or manufacturing processes.

Figure 7:
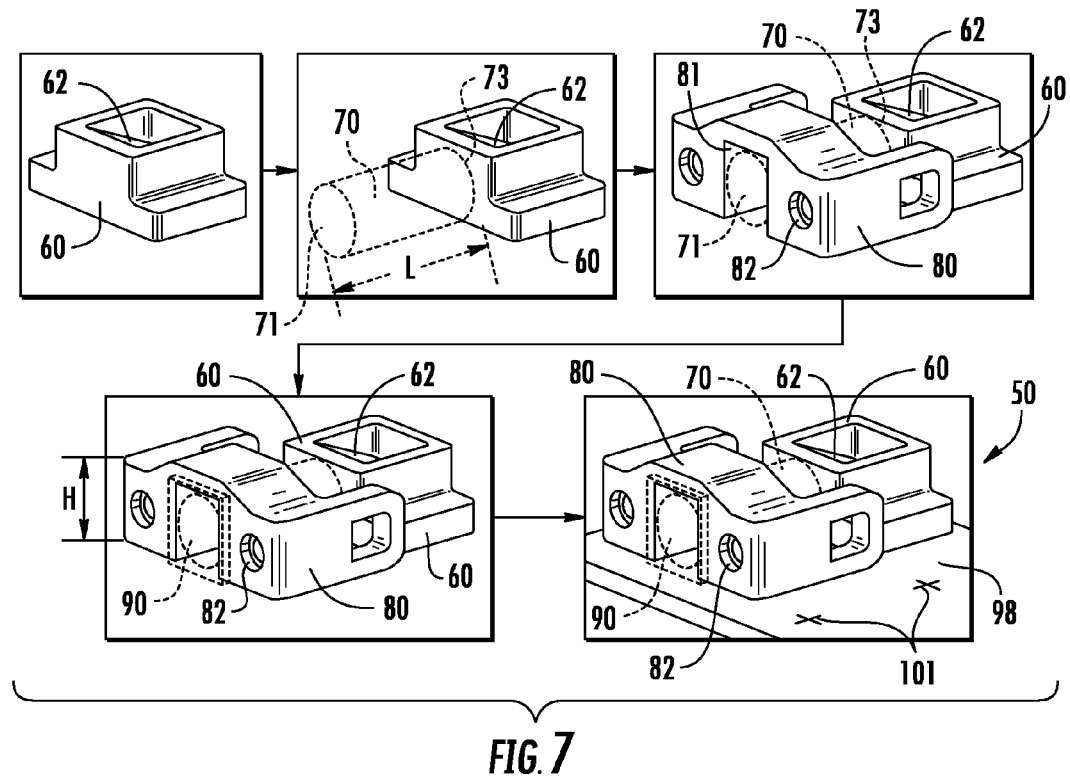
FIG. 7 depicts a series of images showing the construction of the optical interface assembly of the optical interface structure.

FIG. 7 depicts a series of images showing the construction of optical interface assembly 50. Although described in the context of making optical interface assembly 50, the method is applicable to making a coupling assembly for other applications as appropriate. The method of making optical interface assembly 50 includes providing optical turning element 60 and GRIN lens 70. In one example, a first end of GRIN lens 70 is attached to optical turning element 60 using a suitable adhesive. One suitable adhesive allows optical transmission therethrough and is robust enough to accommodate high temperatures such as are experienced during a solder reflow process. Consequently, optical interface assembly 50 can be a portion of an assembly having an IC, circuit board or the like and the assembly can withstand a solder reflow process. As discussed above, the aforementioned alignment features 101 can be used to facilitate aligning and assembling the various components of optical interface assembly 50.

The GRIN lens 70 is aligned to optical turning element 60 at a suitable location on the element. If the optional window 90 is used in the assembly it may be attached to the GRIN lens 70 at any time using a suitable adhesive such as the same adhesive used for attaching the GRIN lens. As shown, window 90 is attached to a second end of GRIN lens 70. Likewise, if optional base 98 is being used, the sub-assembly of optical turning element 60 and GRIN lens 70 may be aligned and attached to the provided base using a suitable adhesive as discussed herein. The connector attachment saddle 80 is then aligned about GRIN lens 70 and secured to base 98 and/or window 90, if used, and the GRIN lens. The method of making optical interface assembly 50 may include other steps and/or components as desired. Once assembled, optical interface assembly 50 may be used on any suitable assembly. In other methods of making, optical interface assembly 50 may be constructed directly on the desired device in a similar fashion.

If optical interface assembly 50 will experience a solder reflow operation, then it is desirable to have a matched thermal response between one or more materials of the optical interface assembly and IC 104 to maintain a proper optical alignment between optical paths on the optical interface assembly and the IC during the process. Put another way, significant changes in temperature during the process will not cause large stresses if the CTE of the primary material (e.g., silicon) of IC 104 and the CTE the material of optical interface assembly 50 are not exactly the same (i.e., there is a CTE difference between materials) because part of the optical interface assembly may be fixed to the IC and that part will expand or contract at a similar rate and reduce stress on the components and the attachment.

By way of example, optical interface assembly 50 is formed from one or more materials that have a CTE that is matched to the CTE of the primary material for IC 104, but in practice the materials will be different and there will be a CTE difference. However, the optical interface assembly 50 materials should be selected to provide the desired performance and material characteristics along with an acceptable CTE difference between the optical interface assembly and the primary material of IC 104. By way of example, an acceptable CTE difference between one or more of the optical interface assembly 50 materials and the primary material of IC 104 at ambient conditions is about $4.0 \times 10^{-6 \circ}$ C. ($\Delta$mm/mm) in one embodiment, about $2.0 \times 10^{-6 \circ}$ C. ($\Delta$mm/mm) in another embodiment, and about $1.0 \times 10^{-6 \circ}$ C. ($\Delta$mm/mm) in yet another embodiment. A typical silicon material is isotropic and has a CTE value of $2.6 \times 10^{-6 \circ}$ C. ($\Delta$mm/mm) at ambient conditions. Thus, for the example given, the CTE of one or more of the optical interface assembly 50 materials is $2.6 \times 10^{-6 \circ}$ C. $\pm 1.0 \times 10^{-6 \circ}$ C. at ambient conditions. Likewise, base 98, if used, may also have a CTE that is matched to that of IC 104.

An example of a suitable material for connector attachment saddle 80 is a polymer that includes a filler to help maintain the desired CTE difference with the material of IC 104. By way of example, the filler makes up a relatively high percentage of the polymer material, for instance, 40 percent or more by weight, or 70 percent or more by weight. An example of a suitable polymer is one having a glass filler of 70 percent or more by weight. Other materials besides glass are possible to use as the filler material(s), such as ceramics like aluminosilicate glass-ceramic, borosilicate glass, quartz and the like. Of course, non-filled materials may be used for connector attachment saddle 80 if they have suitable characteristics and properties. A non-limiting example of a low CTE non-polymer material that may be used for connector attachment saddle 80 is a nickel iron alloy available under the tradename INVAR (e.g., 64FeNi).

Additionally, optical interface assembly 50 may be formed by materials that have a CTE that is generally matched to the CTE of IC 104. By way of example, the CTE of optical turning element 60 and the CTE of IC 104 are matched with a difference between the CTE of the material of the optical turning element that is within 40 percent of the IC material's CTE, but other values for CTE matching are possible and may be influenced by design considerations.

In an example, optical interface assembly 50 is secured using a bonding material, such as epoxy. Also in an example, optical interface assembly 50 is secured using molecular bonding whereby ultra-smooth materials such as glass and silicon are bonded under conditions of heat, pressure and electrical current flow using methods known in the art.

Optical Plug Assembly

Figure 8:
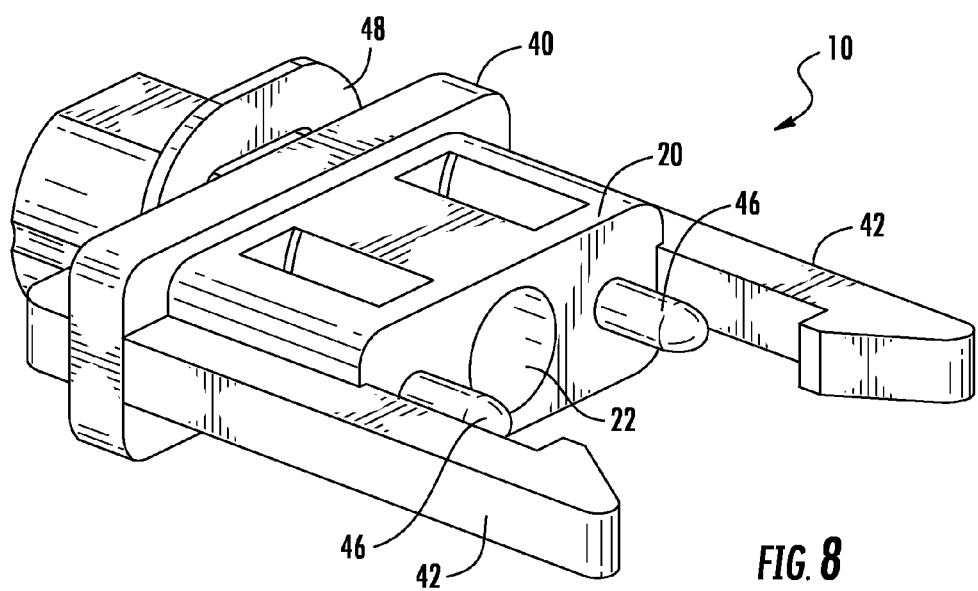
FIG. 8 is a perspective view of the plug of the optical plug assembly depicted in FIG. 1.
Figure 9:
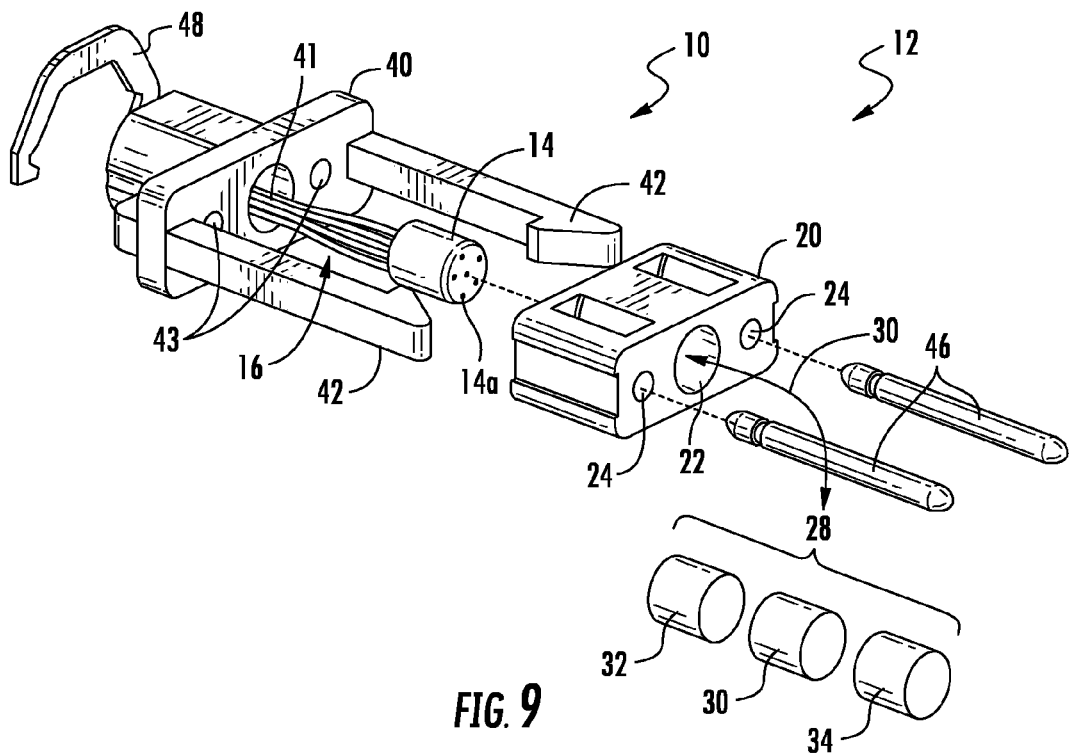
FIG. 9 is an exploded view of the plug depicted in FIG. 8.
Figure 10:
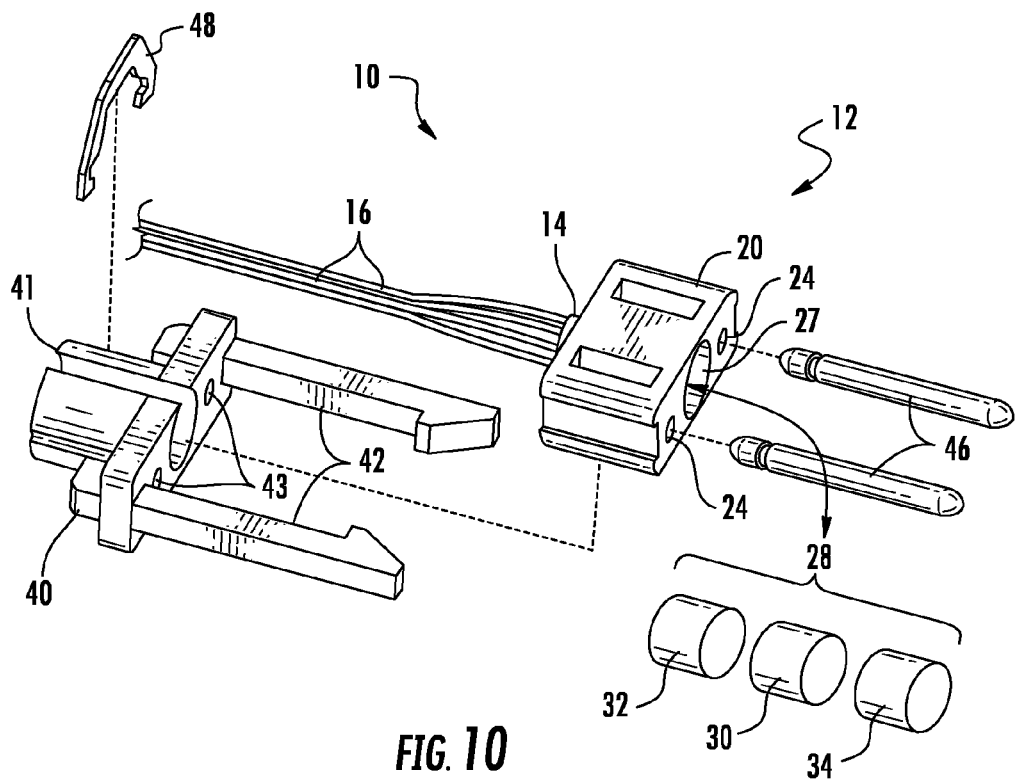
FIG. 10 is a partially exploded view of the optical plug assembly depicted in FIG. 9.

FIG. 8 is a perspective view of optical plug assembly 10 of plug 12, and FIGS. 9 and 10 are exploded views of the plug. As is best shown in FIG. 9, plug 12 includes an optical-fiber organizer 14, an alignment body 20 and a lens assembly 28 that in an example includes a GRIN-lens 30 with non-GRIN material (e.g., flat plates or air-spaces) 32 and 34 on either side so that the optical path OP of optical plug assembly 10 matches that of optical interface assembly 50 (see also FIG. 15). The plug 12 also includes an attachment body 40.

The alignment body 20 includes a passageway 22 that extends from the rear side to the front side of the alignment body and that houses lens assembly 28. Other plug embodiments may include several passageways 22 in any suitable arrangement if more than one lens assembly 28 was used for plug 12. The plug 12 also includes one or more optional alignment pins 46 and an optional retainer 48 for securing the alignment pins. Put another way, alignment pins 46 are not necessary for plug 12 since the alignment pins may instead be a portion of optical interface assembly 50. The alignment body 20 may also optionally include one or more alignment pin bores 24 for receiving the optional alignment pins 46. If used, alignment pin bores 24 extend from a front end to a rear end of alignment body 20.

As shown in FIG. 9, attachment body 40 may also include one or more alignment pin bores 43. The alignment pin bores 43 may extend through a portion of attachment body 40 so that alignment pins 46 can extend therethrough and be secured by retainer 48, as shown in FIG. 8. The attachment body 40 may also include one or more retention features 42 for securing plug 12 to optical interface assembly 50. In this embodiment, retention features 42 are resilient arms having protrusions for cooperating with attachment features 84. In an example, attachment features 84 are configured as openings in connector attachment saddle 80 of optical interface assembly 50.

FIG. 10 is a partially exploded view of plug 12 wherein lens assembly 28 is inserted into passageway 22 of alignment block 20. The GRIN assembly 28 is positioned so that the front face of GRIN lens 30 is positioned near the front surface of alignment body 20 and may be secured in a suitable manner, for example, using an adhesive or the like. The positioning of GRIN assembly 28 may use a passive or active alignment for positioning the cores of optical fibers 16 relative to alignment body 20 as desired. In this embodiment, attachment body 40 includes an open side 41 so that optical fibers 16 may be inserted into the attachment body and thus alignment body 20 may be positioned between retention features 42. Then, alignment pins 46 may be inserted into alignment pin bores 24 of alignment body 20 and alignment pin bores 43 of attachment body 40 so alignment pins 46 are exposed at the back of attachment body 40. Thereafter, alignment pins 46 may be secured by sliding retainer 48 about the alignment pins.

Figure 11:
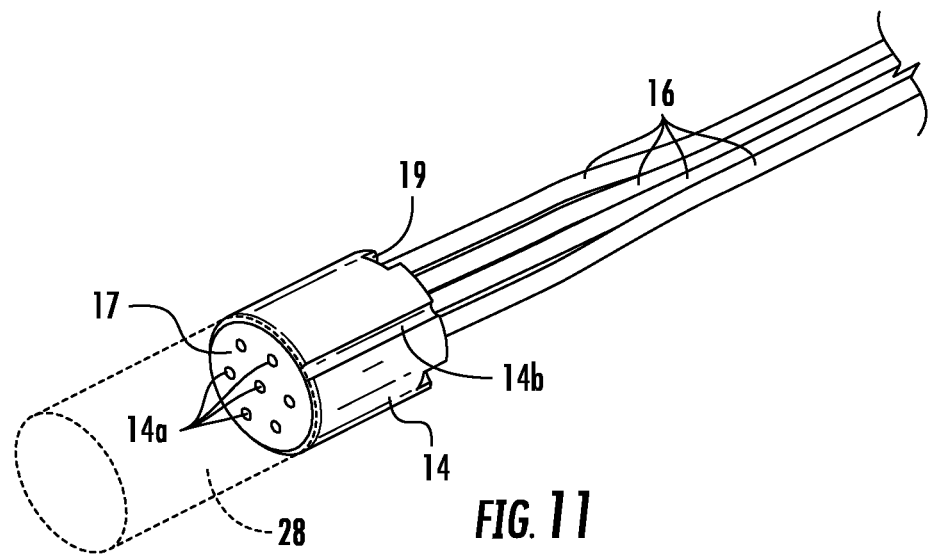
FIGS. 11 and 12, respectively, are a front and rear perspective view of a gradient-index (GRIN) assembly used in the optical plug assembly depicted in FIG. 10.
Figure 12:
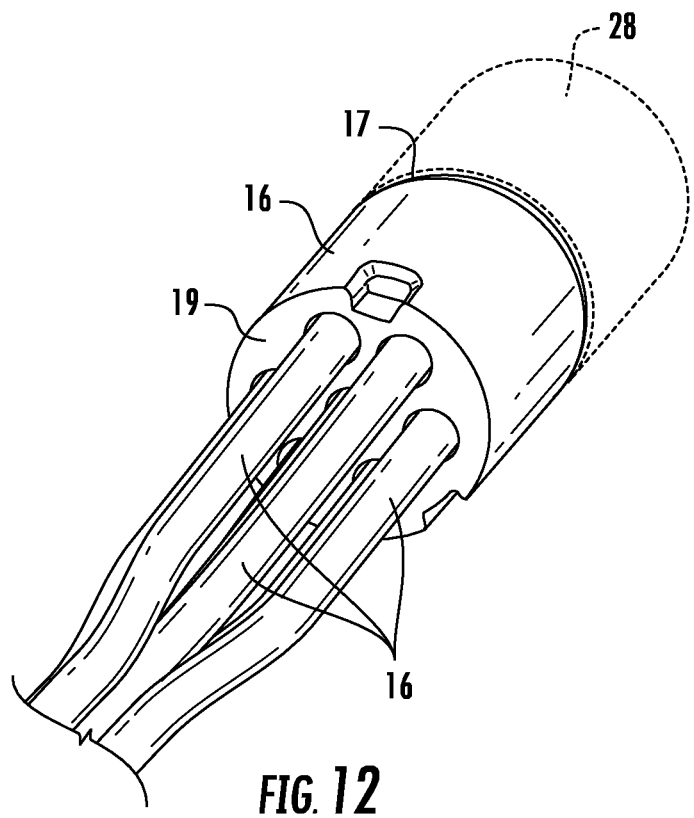

FIGS. 11 and 12, respectively, are a front and rear perspective view of optical-fiber organizer 14 and GRIN assembly 28 used in optical plug assembly 10 to form plug 12. As depicted, optical-fiber organizer 14 includes the plurality of bores 14a arranged in an array 15 that extends from a front end 17 to a rear end 19 of the optical-fiber organizer for receiving one or more optical fibers 16 therein. As non-limiting examples, the arrays 15 may be arranged as linear and/or circular arrays that correspond to the optical channels of IC 104.

In one embodiment, optical fibers 16 are multi-core optical fibers, but other types of optical fibers are possible. In other embodiments, optical-fiber organizer 14 may include a single bore 14a for receiving a single optical fiber 16 if desired. If multi-core optical fibers 16 are used, then the rotational position of each of the optical fibers should be properly aligned within the individual bores 14a of optical-fiber organizer 14 so that the multiple cores are in the desired position with respect to the optical channels of optical interface assembly 50. After optical fibers 16 are secured to optical-fiber organizer 14, the ends of optical fibers 16 may be finished using any suitable method such as a laser processing and/or a mechanical polish as desired. Thereafter, lens assembly 28 may be attached to the end of optical-fiber organizer 14 using a suitable adhesive for optical transmission.

Other variations of optical-fiber organizer 14 are also possible according to the concepts disclosed herein, such as varying the shape (e.g., making it square or some other shape), the arrangement of the alignment structure, etc. Further, optical-fiber organizer 14 may include on the perimeter one or more keys or keyways 14b for cooperating with passageway 22 of alignment body 20 and thereby providing coarse or fine alignment thereto.

Many different arrangements of optical-fiber array 15 may be used with the concepts disclosed. FIG. 13 depicts an end view of a representative optical-fiber organizer 14 showing an optical-fiber array 15 that may be used with a suitable optical plug assembly 10. As depicted, optical-fiber organizer 14 has a plurality of bores 14a that extends from a front end to a rear end and that receives a plurality of optical fibers 16. As shown, optical-fiber organizer 14 includes a plurality of optical fibers 16. Specifically, optical fibers 16 include both multi-core optical fibers and single-core optical fibers. The multi-core optical fibers 16 each have eight cores, but the optical fibers may have a different number of cores as desired. Moreover, the plurality of bores 14a has a suitable spacing of the bores. In this embodiment, the (center-to-center) spacing of adjacent bores 14a is about 375 microns, but other suitable spacing arrangements are possible.

FIG. 14 depicts an end view of an example optical-fiber array 15 that may be used with other plugs 12 having multiple optical-fiber organizers 14 that each receive and operably support multiple optical fibers 16. Put another way, the alignment body of the other plugs 12 either would have other shapes for the passageway that receives the GRIN assemblies or would have multiple passageways for receiving the GRIN assemblies. FIG. 14 shows another array having two smaller outer-diameter optical-fiber organizers 14 arranged in a side-by-side relationship and with a different center-to-center spacing between adjacent optical fibers 16. In this embodiment, the center-to-center spacing between adjacent optical fibers 16 is 450 microns. Other arrangements for array 15 are also possible, including loop-back fibers.

GRIN-Based Optical Connection

Figure 15:
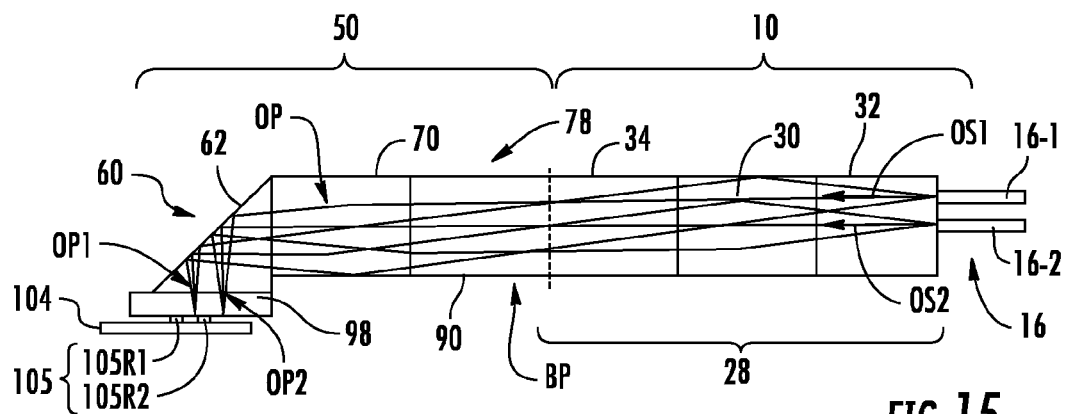
FIG. 15 depicts a simplified schematic representation of two optical paths formed by the optical connection between the optical interface assembly and the optical plug assembly similar to that shown in FIG. 4.

FIG. 15 depicts a simplified schematic representation of two optical channel paths OP1 and OP2 of n channel optical paths OP between two fibers 16 (16-1 and 16-2) and two silicon-based photonic devices ("devices") 105 (e.g., two optical receivers 105R1 and 105R2) operably supported by IC 104. The two optical channel paths OP1 and OP2 are defined by optical plug assembly 10 of plug 12 and optical interface assembly 50. A break point BP (i.e., mating interface) between optical plug assembly 10 and optical interface assembly 50 is shown.

To enable precise turning of optical signals OS1 and OS1 from optical fibers 16-1 and 16-2 toward IC 104, GRIN lenses 30 and 70, respectively, used for optical plug assembly 10 and optical interface assembly 50 each have a respective length L that is less than a quarter pitch (e.g., less than 0.25 P). The pitch is the length for a full sinusoidal period that the ray would traverse in the lens. By way of example, length L can be between 0.5 millimeters (mm) and 5 mm. Further, as an example, the focal length of one of the GRIN lenses 30 and 70 can be between 0.3 mm and 3 mm, which expands the beam associated with optical signal OS such that it has a collimated beam diameter of between about 60 microns and 450 microns. Thus, a GRIN lens 30 or 70 having an outer diameter of about 2 mm or less can accommodate up to 20 optical channels OP from multi-core optical fibers 16.

As shown in FIG. 15, the space between GRIN lens 30 and GRIN lens 70 is filled by non-GRIN material 34 and window 90, and the length of the non-GRIN material is constrained by telecentric conditions in both object space and image space. The mating surfaces of optical interface assembly 50 and plug 12 may be angle polished if desired to decrease return reflections. Further, both non-GRIN material 34 and GRIN lenses 30 and 70 can have anti-reflection coatings for reducing back reflections.

There may be practical limits to the number of optical channels that a single GRIN lens can transmit and receive. For instance, when a shorter length GRIN lens is used, the focal length of the assembly is shorter, the expanded beam size in collimated space is smaller, and the GRIN lens aperture size is also smaller. The smaller aperture size provides a smaller field of view such that a smaller number of multi-core optical fibers 16 can be coupled using a single GRIN lens. On the other hand, to maintain the same fiber-coupling efficiency, a smaller expanded beam size in collimated space provides a larger tolerance for lateral offsets but a smaller tolerance for angular misalignments.

Thus, if larger angular misalignment tolerances are desired, then a short focal length connector is needed, such as about 1.5 mm, as an example, which means a smaller number of multi-core optical fibers 16 can be coupled using common optics. By way of example, a GRIN lens having a focal length of 0.6 mm and an outer diameter of 0.35 mm may be used for coupling one multi-core optical fiber 16, and multiple GRIN lenses can be used.

Consequently, assemblies with multiple GRIN lenses are more tolerant of angular misalignments than assemblies having a configuration that uses a single larger diameter and longer focal length GRIN lens. To illustrate, the single lens configuration shown in FIG. 13 that couples twelve multi-core optical fibers 16 using a GRIN lens with an outer diameter of 1.8 mm and a focal length of 2 mm is more susceptible to angular misalignments than are configurations that use smaller GRIN lenses that couple fewer multi-core optical fibers.

Test Plug for Aligning the Optical Interface Assembly

Figure 16:
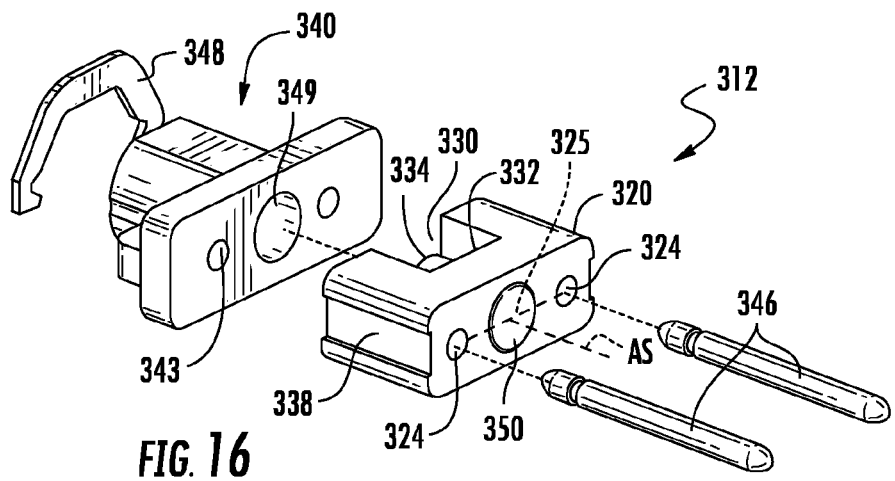
FIG. 16 is a perspective view of an example of a partially assembled test plug used to align the optical interface assembly with the integrated circuit.
Figure 17:
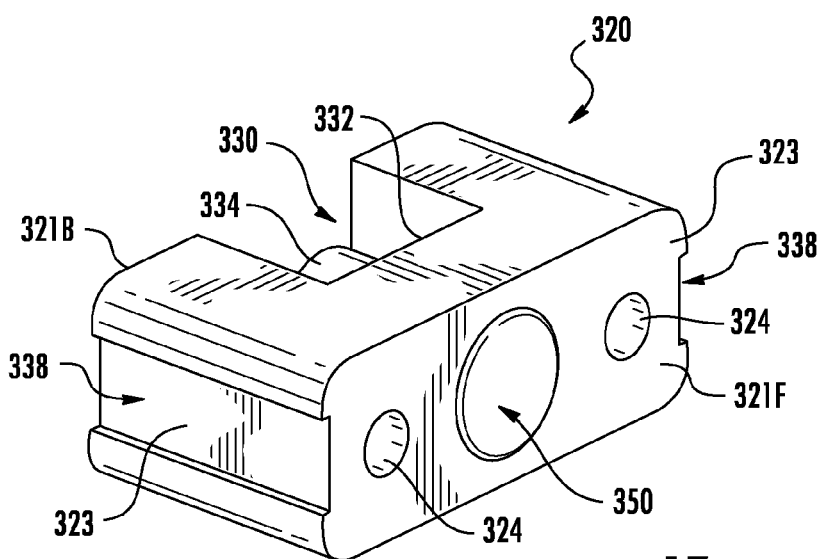
FIG. 17 is a perspective view of an example reflective alignment fixture used to form the example test plug of FIG. 16.
Figure 18:
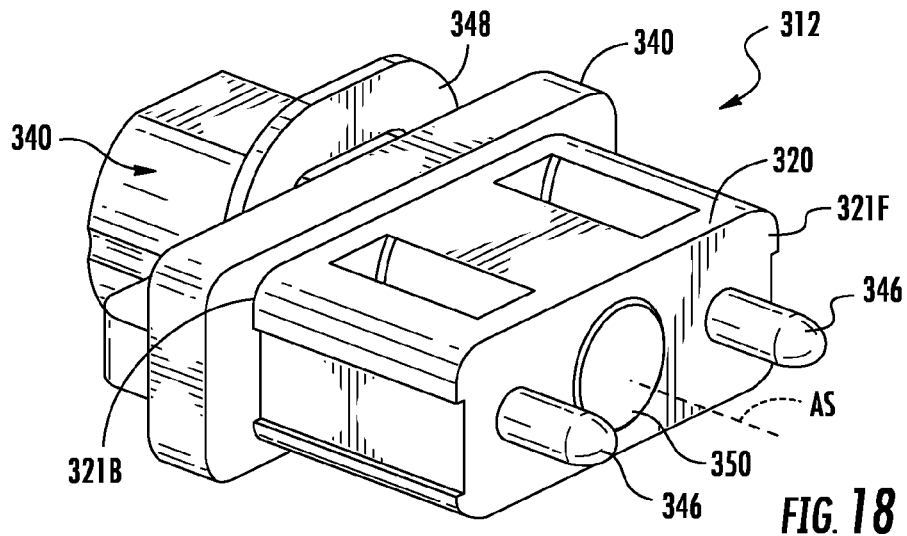
FIG. 18 is a perspective view of the assembled test plug of FIG. 16.

FIG. 16 is a perspective view of an example of a partially assembled proximal plug 312 similar to plug 12 of FIG. 8 and FIG. 9 but that is formed as a test plug and so is referred to hereinafter as "test plug" 312. The example test plug 312 includes a reflective alignment fixture 320 and an attachment body 340 configured to hold (e.g., engage) the alignment fixture, as explained below. FIG. 17 is a perspective view of an example reflective alignment fixture 320. FIG. 18 is a perspective view of the assembled test plug 312. Note that the example reflective alignment fixture 320 does not include retention features like retention features 42 of plug 12 (see FIG. 8). One example way that reflective alignment fixture 320 and attachment body 340 are held together is discussed below.

Reflective alignment fixture 320 includes a front side 321F, a back side 321B, sides 323, and a central axis AS. In an example, front side 321F is generally planar and perpendicular to central axis AS. Reflective alignment fixture 320 may optionally include one or more alignment pin bores 324, such as two such bores in front side 321F and arranged on either side of central axis AS and along a line 325 that passes through the central axis. In an example, alignment pin bores 324 extend from front side 321F to back side 321B of alignment fixture 320 and also run parallel to central axis AS. The one or more alignment pin bores 324 are configured to receive respective one or more alignment pins 346.

In an example, attachment body 340 includes alignment pin bores 343 that align with alignment pin bores 324 when reflective alignment fixture 320 is operably engaged by the attachment body. The alignment pin bores 343 may extend through a portion of attachment body 340 so that alignment pins 346 can extend therethrough and be secured by a retainer 348 as shown in FIG. 18. The alignment pins 346 may not be necessary for test plug 312 since they may instead be a portion of optical interface assembly 50. In an example, alignment pins 346 served to hold together attachment body 340 and reflective alignment fixture 320. The attachment body 340 may also include a central aperture 349.

As best seen in FIG. 17, alignment fixture 320 includes a recess 330 in back side 321B that defines a recess wall 332 and a retaining feature 334 for a resilient member (not shown). In an example, retaining feature 334 is a cylindrical protrusion than can receive or otherwise operably support a resilient member, such as a compression spring (e.g., a wave spring) that in an example partially resides in central aperture 349 of attachment body 340. The reflective alignment fixture 320 further includes key features (e.g., indents) 338 on each of sides 323. The key features 338 are configured to releasably engage retention features of a test plug insertion device, which is introduced and disclosed below.

The reflective alignment fixture 320 also includes a reflective surface 350 on front side 321F of the alignment fixture and centered on central axis AS. In an example, reflective surface 350 is flat and resides in a plane parallel to planar front side 321F. In an example, reflective surface 350 is raised relative to planar front side 321F.

In example embodiments, reflective alignment fixture 320 and attachment body 340 are formed as a single integrally molded piece. In an example, reflective alignment fixture 320 is formed as an integrally molded piece. In another example, the entire front side 321F of reflective alignment fixture 320 constitutes reflective surface 350. In yet another example, reflective alignment fixture 320 is made of metal and reflective surface 350 is defined by a polished portion of front side 321F. As will be appreciated by one skilled in the art, reflective alignment fixture 320 can take on many different forms and be made of many different kinds of materials in order to carry out its reflecting function as part of the alignment methods described below.

The reflective surface 350 can be fabricated by metalizing at least a portion of planar front side 321F so that the reflective surface comprises a metal film. Such metalizing can be accomplished, for example, by vacuum coating or sputter coating. An advantage of this type of metalizing approach is that it eliminates error one might encounter were a separate reflective element joined to a molded alignment fixture 320.

Figure 19A:
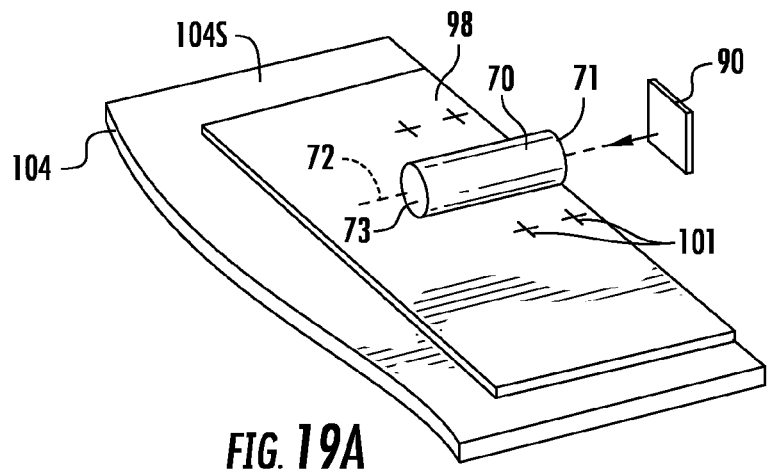
FIG. 19A and FIG. 19B are perspective views of an example base, a GRIN, a window and the underlying integrated circuit, illustrating initial steps in an example method of assembling and aligning the optical interface assembly with the integrated circuit.
Figure 19B:
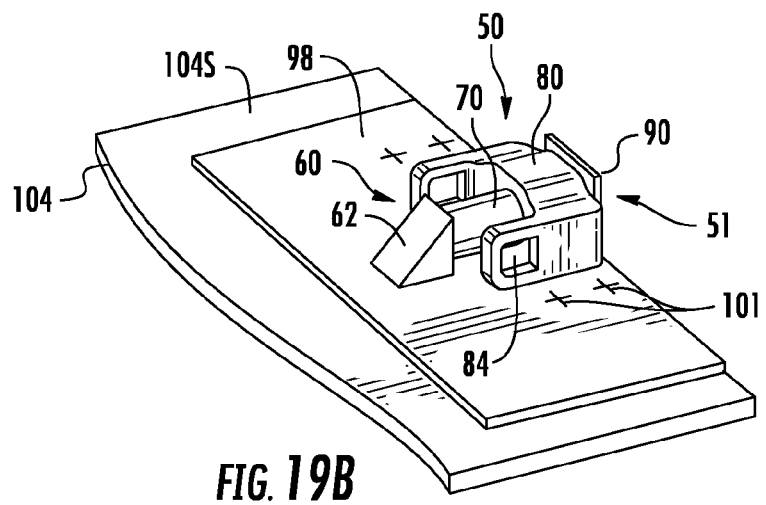

FIG. 19A and FIG. 19B are perspective views of base 98, GRIN lens 70, window 90, and the underlying IC 104, illustrating initial steps of an example method of assembling and aligning optical interface assembly 50 with the IC. In a first step as shown in FIG. 19A, window 90 is attached (e.g., bonded) to front end 71 of GRIN lens 70. Then, with reference to FIG. 19B, connector alignment saddle 80 is disposed over GRIN lens 70 and resides upon base 98.

Figure 20:
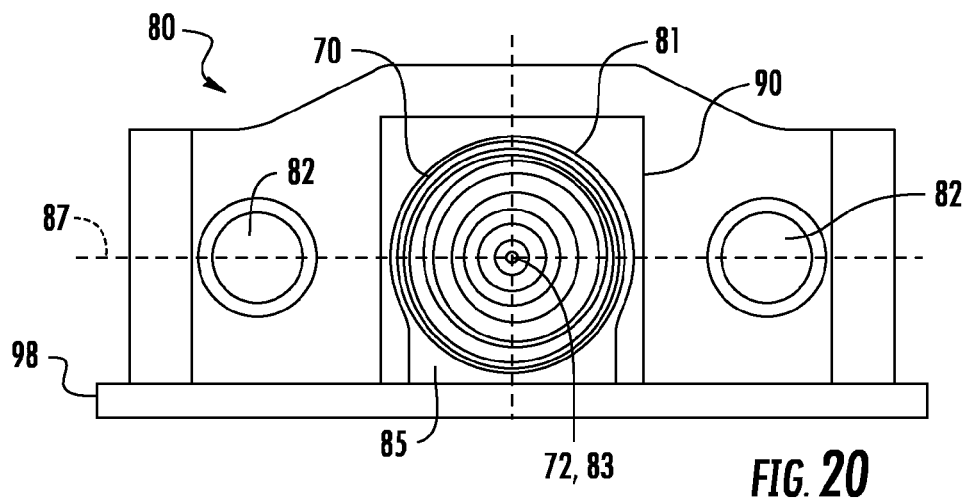
FIG. 20 is a close-up front-on view of an example connector alignment saddle shown operably disposed relative to the GRIN and supported by the base.

FIG. 20 is a close-up front-on view of an example connector alignment saddle 80 shown operably disposed relative to GRIN lens 70 and supported by base 98. The connector alignment saddle 80 includes a central bore 81 with a centerline 83 and an optional bottom opening 85. The central bore 81 is sized to accommodate GRIN lens 70, which has the aforementioned dopant centerline 72. The central bore 81 is oversized to allow for centering GRIN dopant centerline 72 on central bore centerline 83 of connector alignment saddle 80 and for aligning to optical alignment structure (e.g., pin bores) 82, whose centers lie along a line 87 that includes the central bore centerline 83.

Once GRIN lens 70 is aligned in central bore 81, then with reference again to FIG. 19B, window 90 is used to fix the GRIN lens in place within the central bore by bonding the window to the front end of connector alignment saddle 80 (see also FIG. 3).

With continuing reference to FIG. 19B, the next step includes bonding optical turning element 60 to back end 73 of GRIN lens 70 such that GRIN centerline 72 is parallel to base 98. At this point, the basic optical interface assembly 50 has been arranged on base 98. The optical interface assembly 50 is then bonded to base 98.

Figure 21A:
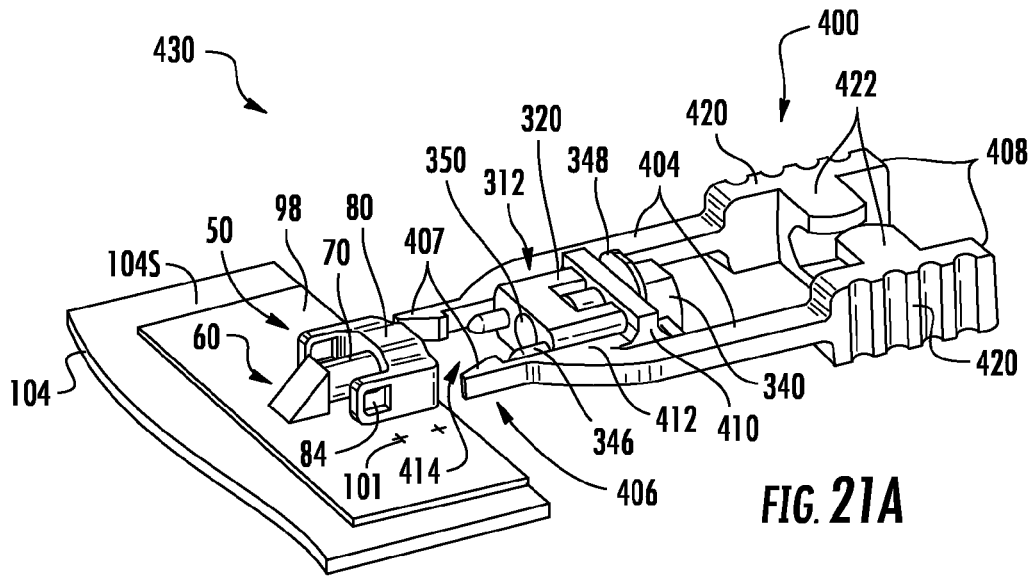
FIG. 21A is a perspective view of the test plug being interfaced with the connector assembly using an insertion device.
Figure 21B:
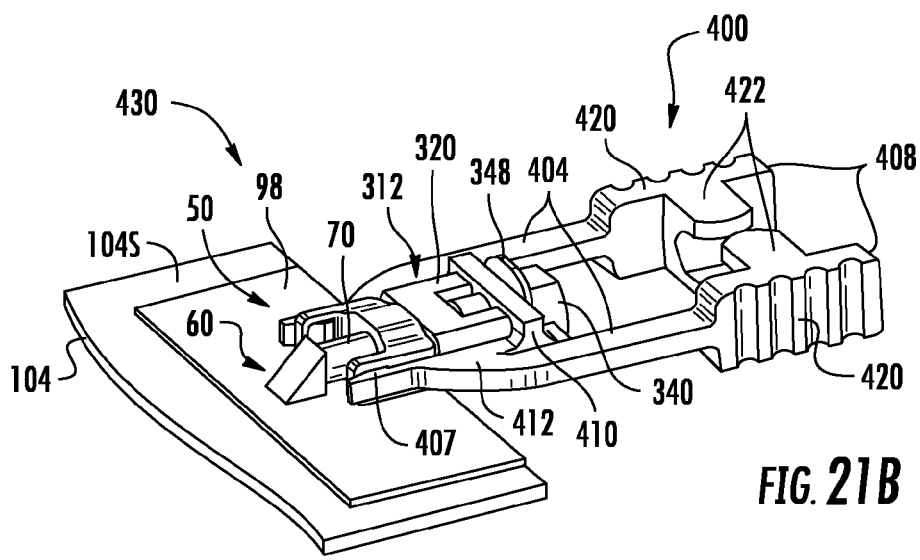
FIG. 21B is similar to FIG. 21A and shows the test plug interfaced with the connector assembly.

The optical interface assembly 50 now needs to be aligned with the underlying IC 104. This is accomplished using test plug 312. FIG. 21A is a perspective view of test plug 312 in the process of being interfaced with optical interface assembly 50. FIG. 21B is similar to FIG. 21A and shows test plug 312 interfaced with optical interface assembly 50. To facilitate the interfacing process, an insertion device 400 can be employed.

FIG. 21A and FIG. 21B also show an example insertion device 400 in the form of a finger-operated clip having two flexible arms 404, which each have a front end 406 and a back end 408. The flexible arms 404 are joined by a cross-piece 410 about one-third of the way from front ends 406, which serve to define an open front end 414. The flexible arms 404 are configured similarly to retention features 42 in that they include protrusions 407 at front ends 406 for cooperating with attachment features 84 of connector attachment saddle 80 of optical interface assembly 50. In an example, flexible arms 404 include respective flat key sections 412 that respectively reside within key features 338 on sides 323 of alignment fixture 320 when insertion device 400 releasably engages test plug 312. The back ends 408 of flexible arms 404 include opposing finger grips 420 that include range-limiting features 422 that engage when the finger grips are squeezed together.

The test plug 312 is sized so that it can be slid into the open front end 414 of insertion device 400 so that key sections 412 of the insertion device reside within key features 338 of reflective alignment body 320 of the test plug. The test plug 312 is then interfaced with optical interface assembly 50 by placing the open end 414 of insertion device 400 in front of optical interface assembly 50 (as shown in FIG. 21A), and then urging the insertion device 400 toward the optical interface assembly so that the optical interface assembly enters the open front end of the insertion device.

Continued urging of insertion device 400 causes protrusions 407 at front ends 406 to engage attachment features 84 of connector attachment saddle 80 of optical interface assembly 50, thereby securing test plug 312 and optical interface assembly 50 in the desired interfaced configuration, with front end 51 of the optical interface assembly confronting front end 321F of attachment fixture 320 so that window 90 confronts reflective surface 350 of the test plug at break point BP. The combination of the interfaced test plug 312 and optical interface assembly 50 constitutes an alignment system 430.

Figure 22A:
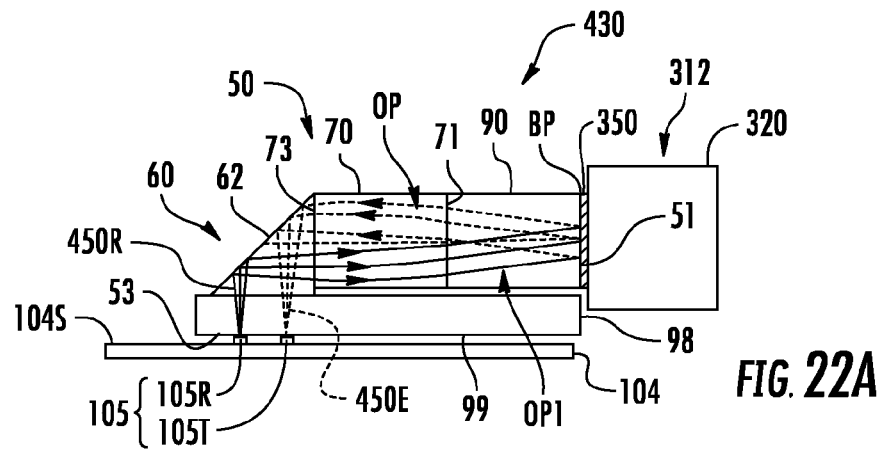
FIG. 22A is a cross-sectional view of an example alignment system showing an example optical path between an optical transmitter and an optical receiver on the integrated circuit as part of the method of aligning the optical interface assembly with the integrated circuit.

Once test plug 312 and optical interface assembly 50 are interfaced, the next step in the method is to adjust the alignment between the optical interface assembly and IC 104 as desired. FIG. 22A is similar to FIG. 15 and depicts a simplified schematic representation of a test optical path OP between optical transmitter 105T and optical receiver 105R of IC 104. In practice, IC 104 may have multiple optical transmitters 105T and multiple optical receivers 105R that define multiple channel optical paths OP between respective multiple optical fibers 16. The optical transmitter 105T and optical receiver 105R reside immediately adjacent back end 53 of optical interface assembly 50, which in the present example is defined by a bottom surface 99 of base 98.

The alignment method includes activating optical transmitter 105T and optical receiver 105R on IC 104. The activation of optical transmitter 105T causes the optical transmitter to emit diverging emitted light 450E, which travels over emitted-light optical path OP upward through base 98 to optical turning element 60. The diverging emitted light 450E then reflects from TIR surface 62, which directs the emitted light to GRIN lens 70. In the example shown, GRIN lens 70 serves to collimate emitted light 450E as it travels through the GRIN lens from back end 73 to front end 71. Emitted light 450E1 then travels through window 90 and reflects from reflective surface 350 to define reflected light 450R that travels over reflected-light optical path to IC 104.

In particular, reflected light 450R travels substantially in the opposite direction as that of emitted light 450E. Thus, reflected light 450R travels through window 90 and GRIN lens 70 in the direction from front surface 71 to back surface 73, where it exits as converging reflected light. The converging reflected light 450R reflects from TIR surface 62 of optical turning element 60 and is directed through base 98 to optical receiver 105R, which detects the converging reflected light and generates a corresponding electrical receiver signal SR (FIG. 23) representative of the intensity of the converging reflected light detected.

It is noted that the alignment methods using test plug 312 do not require that lens assembly 78 include GRIN lens 70. In an exemplary embodiment, lens assembly 78 need not have GRIN optical element 70 and alternatively can include other types of optical elements that have optical power (hereinafter, "optical lensing element"), such as conventional refractive lenses, Fresnel lenses, and holographic optical elements.

The alignment method disclosed herein takes advantage of the symmetry of the channel optical paths OP between optical fibers 16 of plug assembly 10 and optical transmitters 105T and optical receivers 105R of IC 104, as discussed above. The reflective surface 350 of test plug 312 serves to fold optical channel path OP associated with emitted light 450E, so that reflected light 450R from reflective surface 350 is received by respective optical receivers 105R as if they originated from corresponding fibers 16 in plug assembly 10.

Figure 22B:
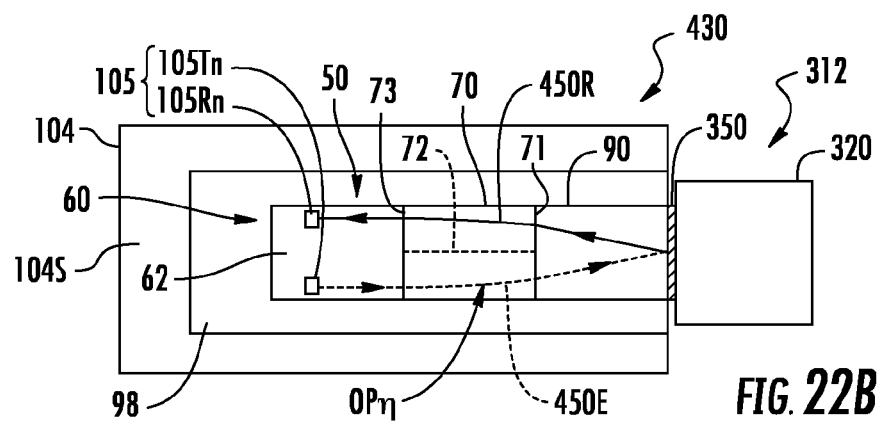
FIG. 22B is a top-down view of the alignment system showing another example optical path between an optical transmitter and an optical receiver on the integrated circuit as part of the method of aligning the optical interface assembly with the integrated circuit.

FIG. 22B is a top-down view of the interfaced structure of FIG. 22A, illustrating an example optical path OPn for emitted light 450E emitted by optical transmitter 105T and the formation of reflected light 450R that is received by optical receiver 105R. In the example of FIG. 22B, optical transmitter 105T and optical receiver 105R are on opposite sides of GRIN centerline 72. In FIGS. 22A and 22B, only one pair of optical transmitters 105T and optical receivers 105R are shown for ease of illustration. In general, multiple pairs of optical transmitters 105T and optical receivers 105R are activated and the above process is carried out for the multiple transmitter/receiver pairs, thereby generating multiple receiver signals SR.

Figure 23:
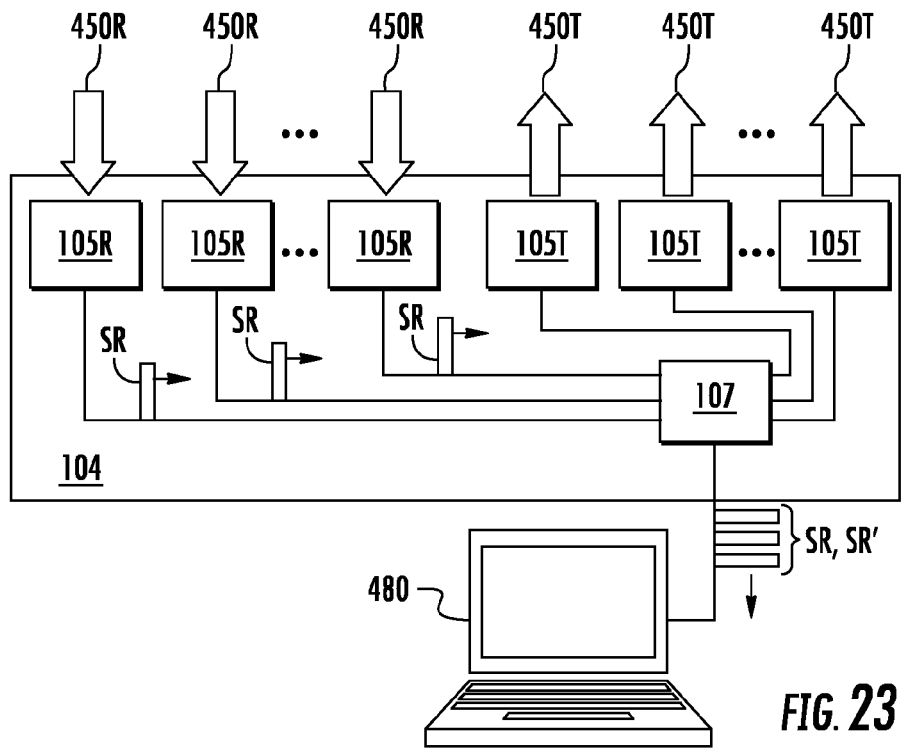
FIG. 23 is a schematic diagram of the integrated circuit showing multiple optical receivers receiving respective reflected light associated with different optical transmitters, and also showing an on-board processor and an external computer for receiving and processing the receiver signals.

FIG. 23 is a schematic diagram of IC 104, showing multiple optical receivers 105R receiving respective reflected light 450R associated with different optical transmitters 105T. The receiver signals SR are directed to a processor 107, which is shown as being part of IC 104. In an example, IC 104 is operably connected to an external computer 480, which can receive either the receiver signals SR or processed versions SR' as processed by on-board processor 107 or both the unprocessed and processed versions of the receiver signals. The external computer 480 can process receiver signals SR and/or processed receiver signals SR'.

At this point, the one or more receiver signals SR are not necessarily at their desired values due to misalignment between optical interface assembly 50 and IC 104. Thus, the next step of the alignment method involves adjusting the relative position of optical interface assembly 50 and IC 104 (e.g., translating and/or rotating the optical interface assembly and base 98 relative to the IC) to determine an aligned position that is based on at least one receiver signal SR. The aligned position need not be the optimally aligned position, i.e., it may be a position that exceeds a certain alignment threshold for the desired optical performance.

When a single receiver signal SR is considered, then using the maximum of the receiver signal is one effective way to establish alignment. When multiple pairs of optical transmitters 105T and optical receivers 105R are employed, the maximum value of all receiver signals SR can be used as one of a number of different criteria to establish alignment. Other criteria include using a maximum sum of all receiver signals SR, an average value of all receiver signals as the maximum, each receiver signal being above a certain threshold value, etc. The on-board processor 107 or external computer 480 can be used to perform the necessary processing of receiver signals SR to identify a suitable alignment of optical interface assembly 150 and IC 104.

Once a suitable alignment position for optical interface assembly 50 and IC 104 is achieved by evaluating one or more receiver signals SR, base 98 is secured (e.g., bonded) to the IC in the aligned configuration.

The next step in the method involves removing test plug 312 from its interfaced position with optical interface assembly 50. In an example, this involves squeezing finger grips 420 of insertion device 400 to open up front end 414 to allow for protrusions 348 to disengage with attachment features 84 of connector attachment saddle 80. The test plug 312 and insertion device 400 can then be moved away from optical interface assembly 50. At this point, optical plug assembly 10 can operably engage the now aligned optical interface assembly 50.

Figure 24A:
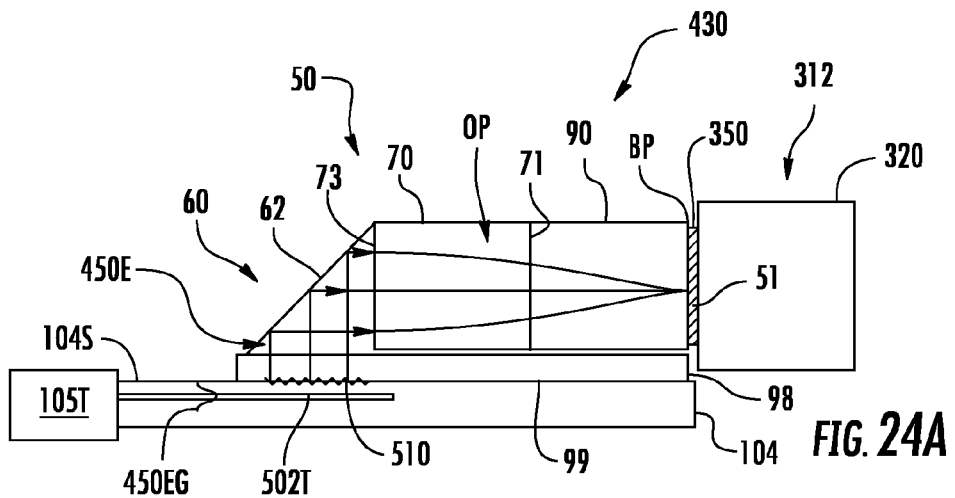
FIGS. 24A and 24B are similar to FIGS. 22A and 22B and illustrate an example alignment system wherein the integrated circuit includes gratings that couple light out of and into optical waveguides supported by the integrated circuit.
Figure 24B:
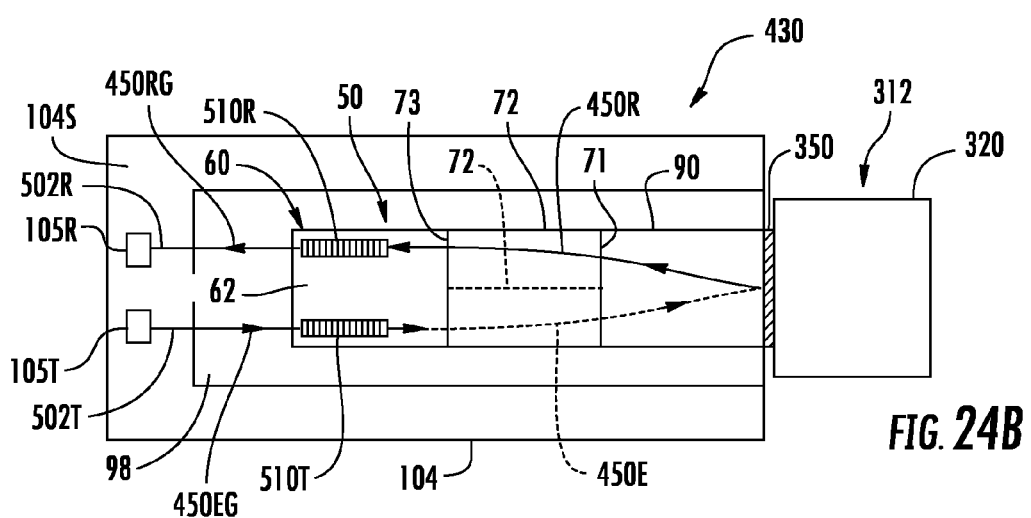

FIGS. 24A and 24B are similar to FIGS. 22A and 22B and show an example of alignment system 430 wherein IC 104 includes optical emitter 105T and optical receiver 105R optically coupled to respective optical waveguides 502T and 502R that are operably supported by the IC, e.g., at an edge of the IC (FIG. 24A) or on IC upper surface 104S (FIG. 24B). First and second gratings 510T and 510R reside on upper surface 104S of IC 104, and the top-down of FIG. 24B shows the two gratings as viewed through optical turning element 60 and base 98.

In the operation of alignment system 430, emitted light 450E from optical emitter 105T is coupled into optical waveguide 502T and travels therein as a guided wave 450EG. The guided wave 450EG eventually encounters grating 510T, which serves to evanescently couple the guided wave from waveguide 502T to form emitted light 450E that travels upward through base 98 to TIR surface 62 of optical turning element 60. The TIR surface 62 redirects emitted light 450E to GRIN lens 70, which focuses this light through window 90 and onto reflective surface 350 to form reflected light 450R. The reflected light 450R travels back through window 90 to GRIN lens 70, which serves to substantially collimate the reflected light. The substantially collimated reflected light 450R then enters optical turning element 60 and is redirected through base 98 by TIR surface 62. The substantially collimated reflected light 450R is then incident upon grating 510R, which serves to couple the reflected light into optical waveguide 502R as a guide wave 450RG. The guide wave 450RG then travels down optical waveguide 502R to optical receiver 105R, which receives the guide wave and in response generates an electrical receiver signal SR (see FIG. 23).

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A method of aligning an optical interface assembly with an integrated circuit that includes at least one optical transmitter and at least one optical receiver, comprising:
    emitting light from the at least one optical transmitter;
    passing the emitted light through the optical interface assembly in a first direction;
    reflecting the emitted light from a reflective surface disposed immediately adjacent a front end of the optical interface assembly to define reflected light that travels back through the optical interface assembly in a second direction that is substantially opposite the first direction;
    receiving the reflected light with the at least one optical receiver and generating in response at least one receiver signal; and
    adjusting a relative position of the optical interface assembly and the integrated circuit to achieve an aligned position based on the at least one receiver signal.

2. The method according to claim 1, including fixing the optical interface assembly and the integrated circuit in the aligned position.

3. The method according to claim 1, wherein the relative position of the optical interface assembly and the integrated circuit based on the at least one receiver signal includes selecting the aligned position based on a predetermined value for the at least one receiver signal.

4. The method according to claim 1, wherein said reflecting is accomplished by interfacing a test plug with the optical interface assembly, and wherein the test plug includes the reflective surface.

5. The method according to claim 1, wherein the optical interface assembly includes a base, and wherein adjusting the relative position includes adjusting a position of the base.

6. The method according to claim 1, wherein the at least one optical transmitter comprises multiple optical transmitters, the at least one optical receiver includes multiple optical receivers, and the at least one receiver signal includes multiple receiver signals.

7. The method according to claim 1, wherein the emitted and reflected light each traverse an optical path that includes an optical turning element, an optical lensing element, and a window.

8. The method according to claim 7, wherein the optical element comprises a gradient-index (GRIN) lens.

9. The method according to claim 1, further comprising:
    removing the reflective surface from the front end of the optical interface assembly; and
    optically connecting a plug assembly to the optical interface assembly, wherein the plug assembly includes at least one optical fiber in optical communication with either the at least one optical transmitter or the at least one optical receiver through the plug assembly and through the optical interface assembly.

10. The method according to claim 1, wherein the optical interface assembly includes an alignment saddle having a central bore, wherein a gradient-index (GRIN) lens resides within the central bore, and further comprising aligning a dopant centerline of the GRIN lens with a centerline of the central bore.

11. An alignment system for aligning an optical interface assembly and an integrated circuit that includes at least one optical transmitter and at least one optical receiver, comprising:
    the optical interface assembly, wherein the optical interface assembly has first and second ends and an optical path therebetween, wherein the second end resides immediately adjacent the at least one optical transmitter and the at least one optical receiver;
    a reflective alignment fixture having a reflective surface and that is interfaced with the first end of the optical interface assembly so that the reflective surface confronts the first end; and
    wherein emitted light from the at least one optical transmitter travels over the optical path to the reflective surface to form reflected light that travels over the optical path from the reflective surface to the at least one receiver, which in response generates at least one receiver signal representative of an amount of reflected light received and thus representative of a degree of alignment between the optical interface assembly and the integrated circuit.

12. The alignment system according to claim 11, wherein the reflective alignment fixture is an integrally molded piece.

13. The alignment system according to claim 11, wherein the optical path is defined by an optical turning element, an optical lensing element and a window.

14. The alignment system according to claim 13, wherein the optical lensing element comprises a gradient-index (GRIN) lens.

15. The alignment system according to claim 11, further including a processor adapted to process the one or more receiver signals to determine the degree of alignment.

16. The alignment system according to claim 11, wherein the optical interface assembly includes a base that interfaces with the integrated circuit, and wherein the base has a position that is adjustable to allow for the optical interface assembly to be fixed in an aligned position with respect to the integrated circuit.

17. A test plug for performing optical alignment of an optical interface assembly having an optical path and an integrated circuit that includes at least one optical transmitter and at least one optical receiver, comprising:
    a reflective alignment fixture that includes a planar front side, a central axis, and a planar reflecting surface on the planar front side, wherein the planar front side is perpendicular to the central axis, and wherein the planar reflecting surface is perpendicular to the central axis;
    an attachment body that holds the reflective alignment fixture; and
    at least one alignment feature configured to engage a complimentary alignment feature of the optical interface assembly such that the reflective surface confronts a front end of the optical interface assembly at an end of the optical path.

18. The test plug according to claim 17, wherein the reflective alignment fixture is an integrally molded piece.

19. The test plug according to claim 17, wherein the attachment body holds the reflective alignment fixture using one or more alignment pins.

20. The test plug according to claim 17, wherein the reflective surface comprises a metal film.

\* \* \* \* \*